United States Patent [19]

Tanaka et al.

[11] Patent Number: 4,800,451
[45] Date of Patent: Jan. 24, 1989

[54] AUTOMATIC REVERSE MECHANISM FOR TAPE RECORDER

[75] Inventors: Shinsaku Tanaka, Setagaya; Kunio Kido, Wako, both of Japan

[73] Assignee: Tanashin Denki Co., Ltd., Japan

[21] Appl. No.: 102,586

[22] Filed: Sep. 29, 1987

[30] Foreign Application Priority Data

Sep. 30, 1986 [JP] Japan .......................... 61-150520[U]
Nov. 21, 1986 [JP] Japan .......................... 61-179413[U]

[51] Int. Cl.$^4$ ...................... G11B 15/18; G11B 15/44
[52] U.S. Cl. .................................... 360/74.2; 360/137
[58] Field of Search ............... 360/74.2, 137; 242/186

[56] References Cited

U.S. PATENT DOCUMENTS 4,511,103  4/1985  Hayashi et al. ............... 360/74.2
4,591,932  5/1986  Aratani ........................ 360/74.2
4,602,302  7/1986  Haruta ......................... 360/74.2
4,604,662  8/1986  Ida et al. ..................... 360/74.2

Primary Examiner—Robert S. Tupper
Attorney, Agent, or Firm—Wegner & Bretschneider

[57] ABSTRACT

Disclosed herein is an automatic reverse mechanism for a tape recorder. The mechanism can automatically reverse the A and B sides of a magnetic tape. Rotary forces from capstans provided on both sides of a magnetic head are transmitted to their corresponding reel shafts, which are provided in a pair symmetrically relative to a magnetic head, by way of their corresponding rotation transmitting members. Based on results of a detection by a mechanical detector capable of detecting a stop of one of the reel shafts, a rotary force is transmitted to the other reel shaft via its corresponding rotation transmitting member by a changeover bar so that the running direction of the magnetic tape is reversed automatically.

19 Claims, 26 Drawing Sheets

AUTOMATIC REVERSE MECHANISM FOR TAPE RECORDER

BACKGROUND OF THE INVENTION (1) Field of the Invention

This invention relates to an automatic reverse mechanism for a tape recorder, which can automatically play one side of a magnetic tape without need for reversing both sides of the magnetic tape after the other side of the magnetic tape has been played.

(2) Description of the Prior Art

As automatic reverse devices for tape recorders, there have heretofore been known those detecting electrically each end of a tape to energize a solenoid so that pinch rollers, which are provided on both sides of a magnetic head respectively, are operated alternately; those detecting mechanically the tension of a tape at each end thereof and operating pinch rollers alternately by the rotary forces of their corresponding flywheels or the like; etc.

Although a variety of automatic reverse devices has been known as mentioned above, the running direction of a tape at the beginning of each operation is the same as its running direction at the time of completion of the previous operation in each of such conventional devices.

Automatic reverse devices, in each of which each end of a tape is electrically detected to cause the tape to run in the reverse direction, are equipped with solenoids, thereby making their structures complex. Use of solenoids is also disadvantageous in reducing the dimensions of tape recorders.

Turning next to automatic reverse devices making use of the rotary force of a flywheel to reverse the running direction of a tape, they generally have such a structure that a pin is provided upright from a portion of the flywheel and a pinch roller changeover mechanism is kicked by the pin. This structure is however accompanied by such drawbacks that the balance of the flywheel may be impaired and since the tension of the tape becomes higher temporarily at the beginning of each operation, this increased tension may be detected to cause a false operation.

When the contents of information recorded on both A and B sides of a tape are continuous for example, it is always desired to start the playback of the information from the A side. In each of conventional automatic reverse devices, the running direction of a tape at the beginning of an operation is the same as that at the time of completion of the previous operation. The conventional automatic reverse devices hence requires a cumbersome operation to return to the A side for the first time if the previous operation has been stopped in the course of the playback of the B side for example.

On the other hand, various types of automatic stop devices have been developed to stop a tape recorder at one end of a magnetic tape. There is however no automatic reverse mechanism which can also be used as an automatic stop device. If an automatic stop device is provided in addition to an automatic reverse mechanism, the overall structure of the tape recorder becomes unavoidably complex and renders difficult the size reduction of the tape recorder.

In a tape recorder equipped with a conventional automatic reverse mechanism, the magnetic tape, reel shafts and the like are not visible from the outside especially when the tape recorder is used in a form built in a vehicle. Such a tape recorder is hence accompanied by an inconvenience that the user cannot find out in which direction the tape is running.

Furthermore, a tape recorder equipped with a conventional automatic reverse mechanism does not permit free change-over from the playback mode to the fast feeding mode, from the fast feeding mode to the playback mode in the same feeding direction, or from the fast feeding mode to the playback mode in the opposite feeding direction.

SUMMARY OF THE INVENTION

With the foregoing in view, the present invention has as a first object thereof the provision of an automatic reverse mechanism for a tape recorder, which can automatically reverse the running direction of a tape without need for accessory parts such as solenoids and hence facilitates the size reduction of the tape recorder, is free from adverse effects to the balance of flywheels and false operations.

A second object of this invention is to provide an automatic reverse mechanism for a tape recorder, which makes the running direction of the tape always the same at the beginning of an operation such as playback, recording or the like after each operation of a stop mechanism.

A third object of this invention is to achieve further size reduction and structural simplification of the automatic reverse mechanism which can achieve the second object of this invention.

A fourth object of this invention is to provide an automatic reverse mechanism for a tape recorder, which can automatically reverse the tape without need for accessories such as solenoids and hence facilitates the size reduction of the tape recorder, is free from adverse effects to the balance of flywheels and false operations, and can also be used as an automatic stop device.

A fifth object of this invention is to provide an automatic reverse mechanism for a tape recorder, which does not require accessories such as solenoids and hence facilitates the size reduction of the tape recorder, is free from adverse effects to the balance of flywheels and false operations, and permits free change-over from the playback mode to the fast feeding mode, from the fast feeding mode to the playback mode in the same feeding direction, or from the fast feeding mode to the playback mode in the opposite feeding direction.

In one aspect of this invention, there is thus provided an automatic reverse mechanism for a tape recorder, in which capstans, pinch rollers and reel shafts are arranged symmetrically on both sides of an associated magnetic head, the capstans on both sides of the magnetic head and either one of said reel shafts are normally driven and rotated, the pinch roller on the same side as the rotating reel shaft is pressed against the corresponding capstan to cause the magnetic tape of a tape cassette inserted in the tape recorder to run in one direction, and when the magnetic tape has been fully wound up, the running direction of the magnetic tape is automatically changed over, comprising:

a rotation transmitting means having a pair of rotation transmitting members arranged symmetrically relative to the magnetic head, said rotation transmitting members being rotated normally under rotary forces of the corresponding capstans so as to transmit the rotary forces to the corresponding reel shafts via friction mechanisms respectively;

an eccentric circular cam surface provided eccentrically about a rotary shaft of at least one of the rotation transmitting members, and an engagement portion provided with said at least one rotation transmitting member;

a reel-shaft stop detecting means for detecting each stop of at least one of the reel shafts, said means having a cam follower portion and a contact portion and adapted to receive a rotary force of said at least one reel shaft via a reel-stop detecting friction mechanism; said cam follower being maintained in sliding contact with the eccentric circular cam surface so as to avoid engagement between the contact portion and the engagement portion and when said at least one reel shaft stops, remaining at a position apart from the eccentric circular cam surface, whereby the contact portion is allowed to engage the engagement portion and at the same time said at least one rotation transmitting member is displaced from an engagement position to a non-engagement position relative to the corresponding reel shaft by a turning force developed in said at least one rotation transmitting member; and a reversing means operable responsive to each displacement of said at least one rotation transmitting member to the non-engagement position so that the pinch roller associated with said at least one rotation transmitting member is separated from its corresponding capstan, the other pinch roller is brought into contact with the other rotation transmitting member, and the other rotation transmitting member is displaced to an engagement position relative to its corresponding reel shaft.

In another aspect of this invention, there is also provided an automatic reverse mechanism for a tape recorder, in which capstans, pinch rollers and reel shafts are arranged symmetrically on both sides of an associated magnetic head, the capstans on both sides of the magnetic head and either one of said reel shafts are normally driven and rotated, the pinch roller on the same side as the rotating reel shaft is pressed against the corresponding capstan to cause the magnetic tape of a tape cassette inserted in the tape recorder to run in one direction, and when the magnetic tape has been fully wound up, the running direction of the magnetic tape is automatically changed over, comprising:

a rotation transmitting means having a pair of rotation transmitting members arranged symmetrically relative to the magnetic head, said rotation transmitting members being rotated normally under rotary forces of the corresponding capstans so as to transmit the rotary forces to the corresponding reel shafts via friction mechanisms respectively;

an eccentric circular cam surface provided eccentrically about a rotary shaft of at least one of the rotation transmitting members, and an engagement portion provided with said at least one rotation transmitting member;

a reel-shaft stop detecting means for detecting each stop of at least one of the reel shafts, said means having a cam follower portion and a contact portion and adapted to receive a rotary force of said at least one reel shaft via a reel-stop detecting friction mechanism; said cam follower being maintained in sliding contact with the eccentric circular cam surface so as to avoid engagement between the contact portion and the engagement portion and when said at least one reel shaft stops, remaining at a position apart from the eccentric circular cam surface, whereby the contact portion is allowed to engage the engagement portion and at the same time said at least one rotation transmitting member is displaced from an engagement position to a non-engagement position relative to the corresponding reel shaft by a turning force developed in said at least one rotation transmitting member;

a reversing means operable responsive to each displacement of said at least one rotation transmitting member to the non-engagement position so that the pinch roller associated with said at least one rotation transmitting member is separated from its corresponding capstan, the other pinch roller is brought into contact with the other rotation transmitting member, and the other rotation transmitting member is displaced to an engagement position relative to its corresponding reel shaft; and a means for determining the starting side of the tape cassette by controlling the reversing means in such a way that an operating mode of the tape recorder is released to stop the tape recorder and responsive to the stop of the tape recorder one of the rotation transmitting members, said one rotation transmitting member being on a predetermined side, is displaced to the engagement position relative to the corresponding reel shaft.

In a further aspect of this invention, there is also provided an automatic reverse mechanism for a tape recorder, in which capstans, pinch rollers and reel shafts are arranged symmetrically on both sides of an associated magnetic head, the capstans on both sides of the magnetic head and either one of said reel shafts are normally driven and rotated, the pinch roller on the same side as the rotating reel shaft is pressed against the corresponding capstan to cause the magnetic tape of a tape cassette inserted in the tape recorder to run in one direction, and when the magnetic tape has been fully wound up, the running direction of the magnetic tape is automatically changed over, comprising:

a rotation transmitting means having a pair of rotation transmitting members arranged symmetrically relative to the magnetic head, said rotation transmitting members being rotated normally under rotary forces of the corresponding capstans so as to transmit the rotary forces to the corresponding reel shafts via friction mechanisms respectively;

an eccentric circular cam surface provided eccentrically about a rotary shaft of at least one of the rotation transmitting members, and an engagement portion provided with said at least one rotation transmitting member;

a reel-shaft stop detecting means for detecting each stop of at least one of the reel shafts, said means having a cam follower portion and a contact portion and adapted to receive a rotary force of said at least one reel shaft via a reel-stop detecting friction mechanism; said cam follower being maintained in sliding contact with the eccentric circular cam surface so as to avoid engagement between the contact portion and the engagement portion and when said at least one reel shaft stops, remaining at a position apart from the eccentric circular cam, whereby the contact portion is allowed to engage the engagement portion and at the same time said at least one rotation transmitting member is displaced from an engagement position to a non-engagement relative to the corresponding reel shaft by a turning force developed in said at least one rotation transmitting member;

a reversing means operable responsive to each displacement of said at least one rotation transmitting member to the non-engagement position so that the pinch roller associated with said at least one rotation transmitting member is separated from its corresponding capstan, the other pinch roller is brought into contact with the other rotation transmitting member, and the other rotation transmitting member is displaced to an engagement position relative to its corresponding reel shaft; and a means for determining the starting side of the tape cassette by controlling the reversing means in such a way that an operating mode of the tape recorder is released to stop the tape recorder and responsive to the stop of the tape recorder one of the rotation transmitting members, said one rotation transmitting member being on a predetermined side, is displaced to the engagement position relative to the corresponding reel shaft;

wherein the rotation transmitting means includes, in addition to said pair of rotation transmitting members, a pair of turnable members which are arranged symmetrically relative to the magnetic head, are turnable respectively about predetermined central axes, carry the corresponding rotation transmitting members rotatably thereon, and are connected at one ends thereof to the reversing means, and the startingside determining means is equipped with a reverse mode selector means which permits manual selection of either one of two positions and stops an operation of the tape recorder responsive to a displacement of one of the turnable members only at one of the two positions.

In a still further aspect of this invention, there is also provided an automatic reverse mechanism for a tape recorder, in which capstans, pinch rollers and reel shafts are arranged symmetrically on both sides of an associated magnetic head, the capstans on both sides of the magnetic head and either one of said reel shafts are normally driven and rotated, the pinch roller on the same side as the rotating reel shaft is pressed against the corresponding capstan to cause the magnetic tape of a tape cassette inserted in the tape recorder to run in one direction, and when the magnetic tape has been fully wound u, the running direction of the magnetic tape is automatically changed over, comprising:

a rotation transmitting means having a pair of rotation transmitting members arranged symmetrically relative to the magnetic head, said rotation transmitting members being rotated normally under rotary forces of the corresponding capstans so as to transmit the rotary forces to the corresponding reel shafts via friction mechanisms respectively;

an eccentric circular cam surface provided eccentrically about a rotary shaft of at least one of the rotation transmitting members, and an engagement portion provided with said at least one rotation transmitting member;

a reel-shaft stop detecting means for detecting each stop of at least one of the reel shafts, said means having a cam follower portion and a contact portion and adapted to receive a rotary force of said at least one reel shaft via a reel-stop detecting friction mechanism; said cam follower being maintained in sliding contact with the eccentric circular cam surface so as to avoid engagement between the contact portion and the engagement position and when said at least one reel shaft stops, remaining at a position apart from the eccentric circular cam surface, whereby the contact portion is allowed to engage the engagement position and at the same time said at least one rotation transmitting member is displaced from an engagement position to a non-engagement position relative to the corresponding reel shaft by a turning force developed in said at least one rotation transmitting member;

a reversing means operable responsive to each displacement of said at least one rotation transmitting member to the non-engagement position so that the pinch roller associated with said at least one rotation transmitting member is separated from its corresponding capstan, the other pinch roller is brought into contact with the other rotation transmitting member, and the other rotation transmitting member is displaced to an engagement position relative to its corresponding reel shaft;

a fast forward feeding member for causing the magnetic head to retreat when the fast forward feeding member is manually pushed in a playback mode;

a lock means for holding the fast forward feeding member at a pushed position upon manual pushing of the fast forward feeding member, said lock means releasing the holding of the fast forward feeding member when the fast forward feeding member is pushed again; and a fast forward feeding release means for releasing the holding of the fast forward feeding member responsive to an operation of the reversing means when the fast forward feeding member is held at its pushed position by the lock means.

Accordingly, the automatic reverse mechanisms of this invention for a tape recorder can bring about one or more of the following advantageous effects:

(1) In the above-described construction, the pinch roller changeover member is not actuated while either one of the reel shafts is rotating. When either one of the reel shafts has stopped, the changeover member is moved in the opposite direction to alternately actuate the left-hand and right-hand pinch rollers. Accordingly, it does not require accessory parts such as solenoids and facilitates the size reduction.

(2) The automatic reverse mechanism is free from such dangers that the balance of rotation of the flywheels may be deleteriously affected and false operations may take place at start.

(3) Since the running direction of the tape is always the same at the beginning of a playback or recording operation, it is unnecessary to perform the cumbersome operation to reverse the running direction of the tape at the beginning of each playback operation, for example, even if the contents of information on the A and B sides of the tape are continuous.

(4) The automatic reverse mechanism has such an advantage that it can also be used as an automatic stop device by suitably selecting the position of one of the selecting members.

(5) The automatic reverse mechanism permits free manual change-over from the playback mode to the fast feeding mode, from the fast feeding mode to the playback mode in the same feeding direction and/or from the fast feeding mode to the playback mode in the opposite feeding direction, and can hence provide a wide variety of functions.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE INVENTION AND PREFERRED EMBODIMENTS

Figure 1:
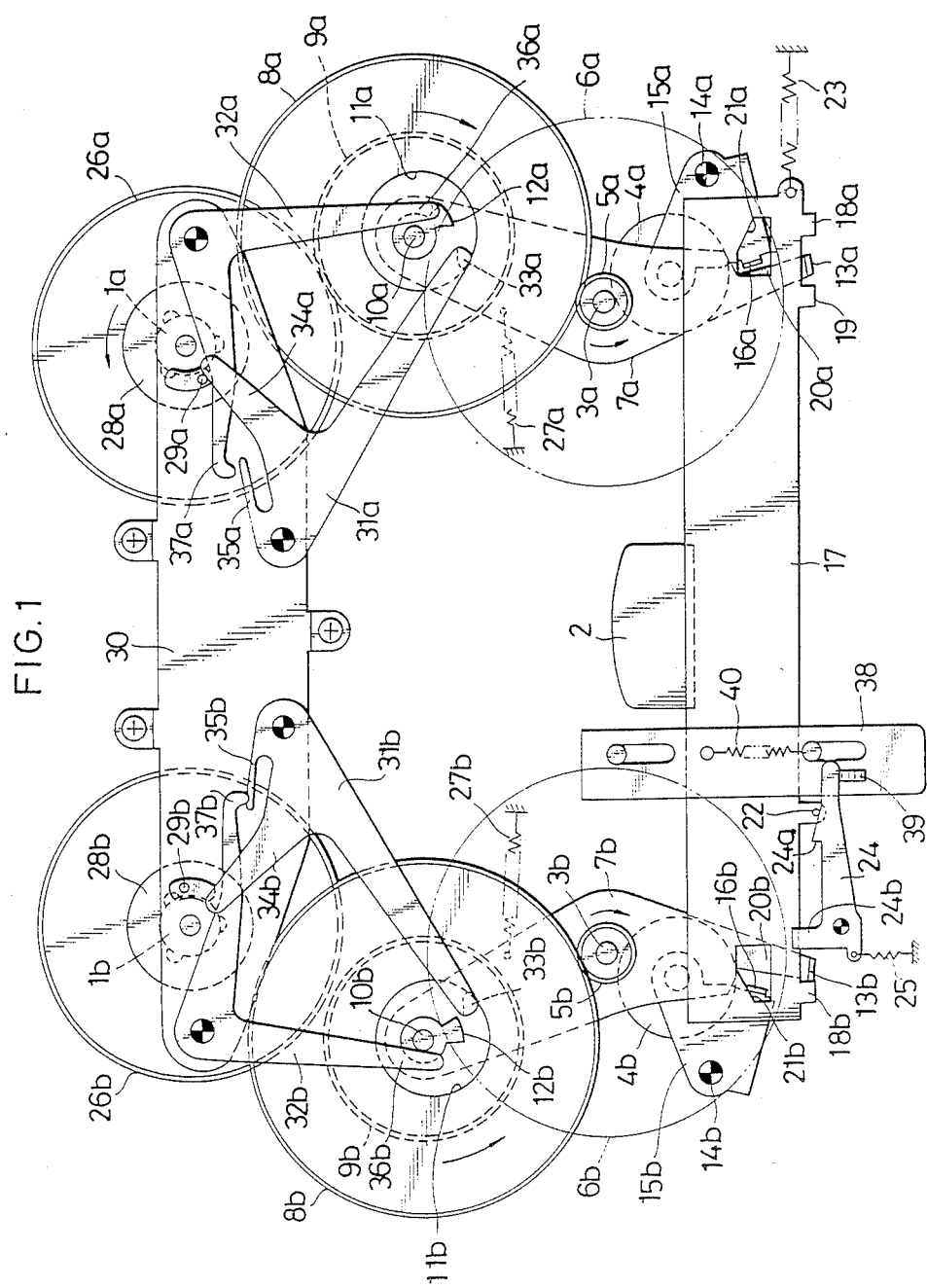
FIG. 1 to FIG. 4 schematically illustrate the structure of an automatic reverse mechanism according to a first embodiment of this invention.
Figure 2:
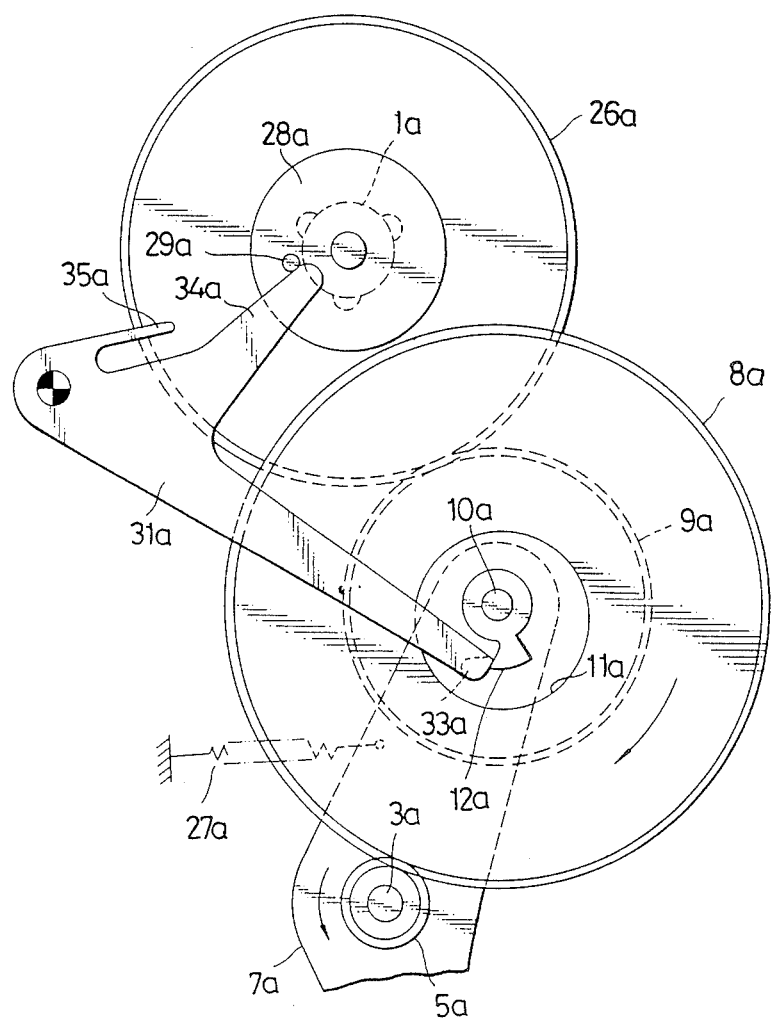
Figure 3:
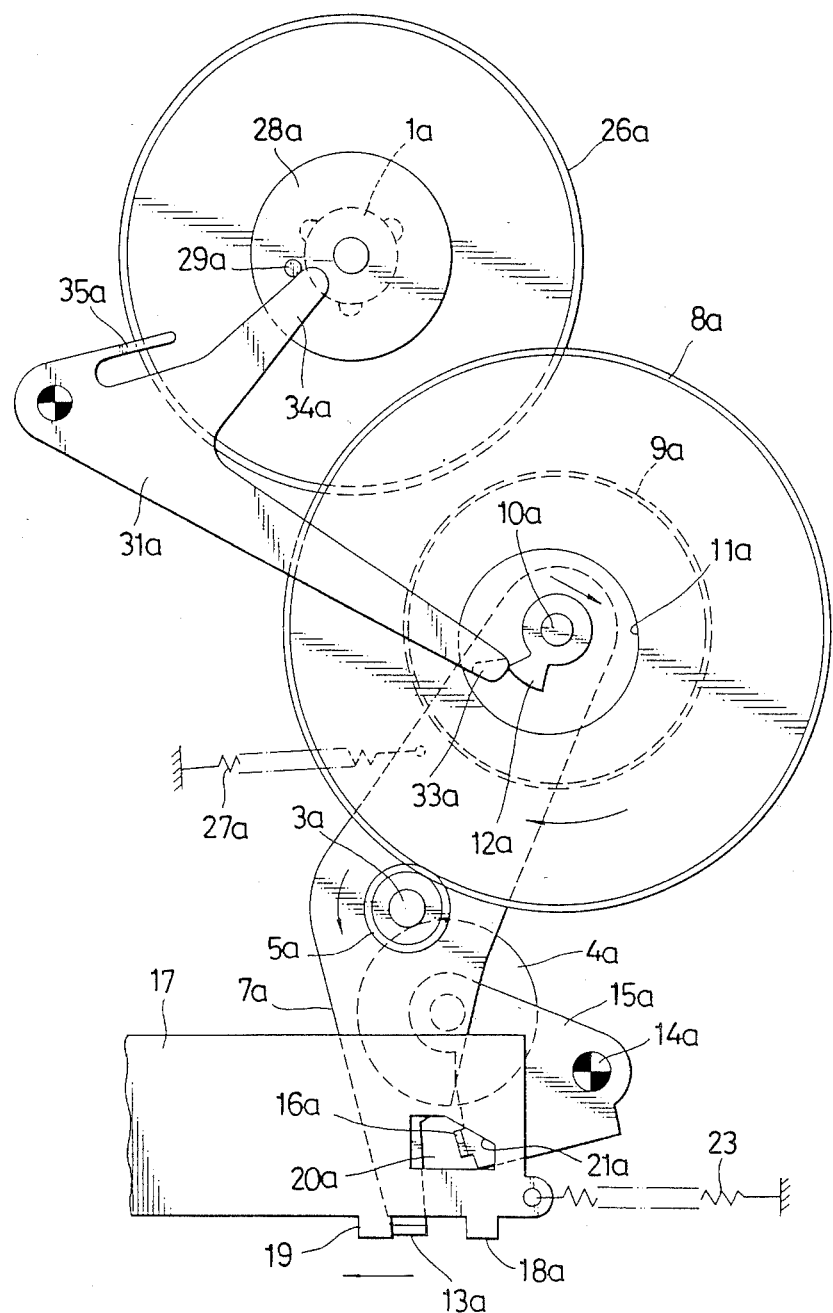

FIG. 1 to FIG. 5 show the first embodiment of this invention. A right-hand reel shaft 1a is rotated in FIG. 1 while a left-hand reel shaft 1b is driven in FIG. 4. FIG. 2 and FIG. 3 illustrate the automatic reverse mechanism in the course of its change from the state shown in FIG. 1 to its state depicted in FIG. 4.

Referring first of all to FIG. 1, capstans 3a,3b, pinch rollers 4a,4b and the above-mentioned reel shafts 1a,1b are symmetrically arranged on both sides of a magnetic head 2. Small diameter gears 5a,5b and flywheels 6a,6b are respectively secured on the capstans 3a,3b. Further, rotation transmitting members, namely, turnable levers 7a,7b are also provided on their corresponding capstans 3a,3b in such a way that the turnable levers 7a,7b are allowed to turn about their corresponding capstans 3a,3b. Rotation transmitting units composed in combination of large diameter gears 8a,8b and small diameter gears 9a,9b respectively are supported on one ends of the turnable levers 7a,7b via shafts 10a,10b. Eccentric circular cam surfaces 11a,11b are formed respectively about the shafts 10a,10b. In addition, cams 12a,12b also project from and in continuation with the shafts 10a,10b at positions where the eccentric circular cam surfaces 11a,11b have the maximum radii. On the other hand, the other ends of the turnable levers 7a,7b terminate in bent end portions 13a,13b.

The pinch rollers 4a,4b are supported on brackets 15a,15b, which are pivotal about pivots 14a,14b respectively, so that the pinch rollers 4a,4b can be releasably brought into contact with their corresponding capstans 3a,3b. Bent edge portions 16a,16b are also provided on the brackets 15a,15b.

Figure 4:
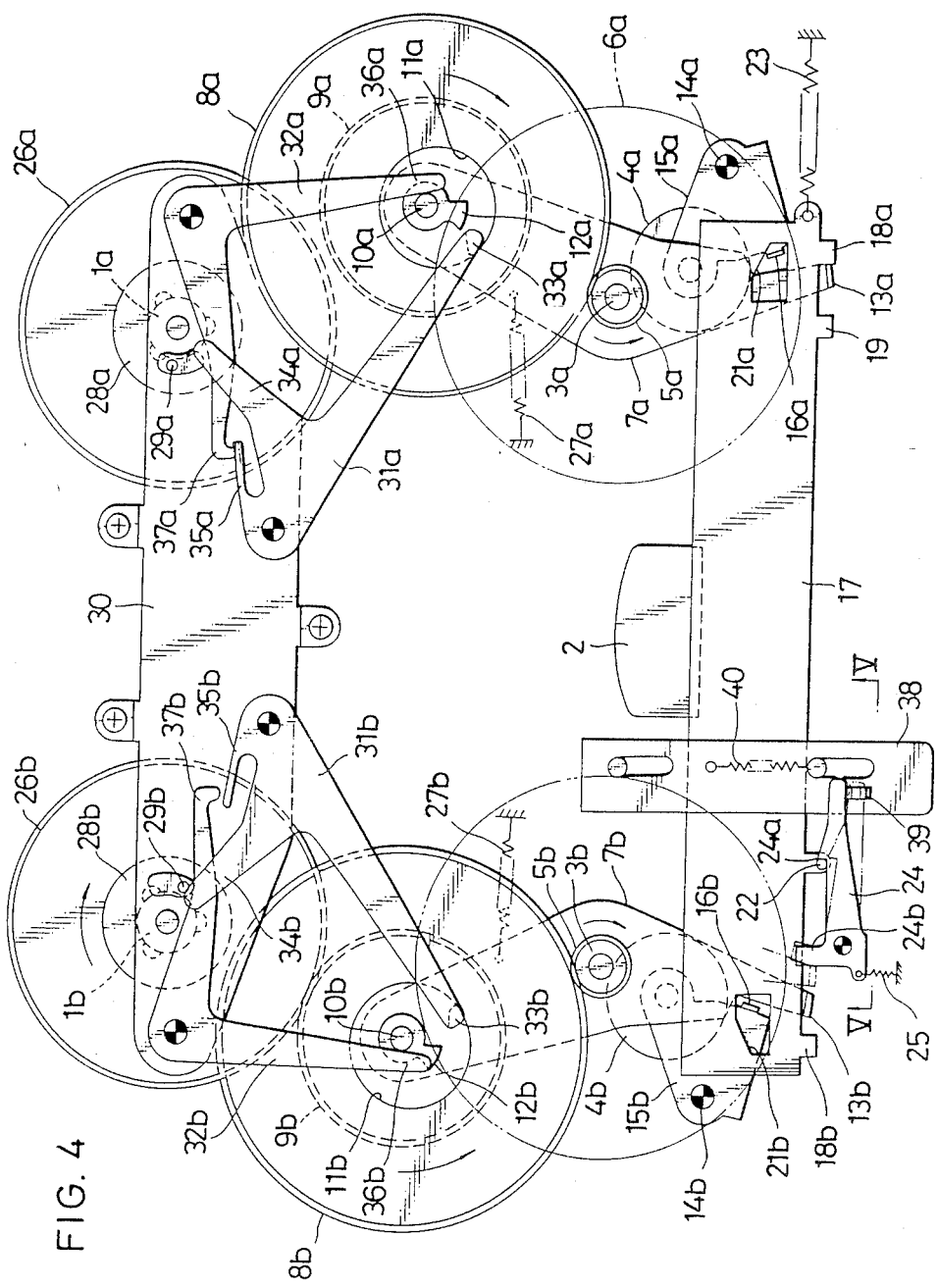

Designated at numeral 17 is a pinch roller changeover member, namely, a changeover bar which is slidable horizontally as viewed in FIG. 1. This changeover bar 17 is provided with lugs 18a,19 in such a way that the bent end portion 13a of the right-hand lever 7a is interposed between the lugs 18a,19. Furthermore, a lug 18b is provided on the changeover bar 17 at a position on the left of the bent end portion 13b of the left-hand turnable lever 7b. The changeover bar 17 also defines openings 20a,20b which receive the bent edge portions 16a,16b of the brackets 15a,15b respectively. Tilted edges 21a,21b are formed by the openings 20a,20b. When the changeover bar 17 moves rightwards, the left-hand tilted edge 21b is caused to slide on the bent edge portion 16b of the left-hand bracket 15b as illustrated in FIG. 1, whereby the left-hand pinch roller 4b is separated from its corresponding capstan 3b. When the changeover bar moves leftwards, the right-hand tilted edge 21a is caused to slide on the bent edge portion 16a of the right-hand bracket 15a as illustrated in FIG. 4, whereby the right-hand pinch roller 4a is separated from its corresponding capstan 3a. However, the respective brackets 15a,15b are urged by their corresponding unillustrated springs in such directions that the respective pinch rollers 4a,4b are pressed against their corresponding capstans 3a,3b.

An engagement pin 22 is provided upright at a position on the changeover bar 17. The changeover bar 17 is normally biased rightwards by a tension spring 13.

At a location near the changeover bar 17, a hook member 24 is provided turnably. This hook member 24 has an engagement tab 24a corresponding to the engagement pin 22 and a pressure-receiving portion 24b corresponding to the bent end portion 13b of the left-hand turnable lever 7b, and is urged by a tension spring 25 in a counterclockwise direction as viewed in the drawings.

Of the large diameter gears 8a,8b and small diameter gears 9a,9b which in combination constitute the rotation transmitting units, the large diameter gears 8a,8b are maintained in meshing engagement with the small diameter gears 5a,5b provided integrally with their corresponding capstans 3a,3b while the small diameter gears 9a,9b are selectively engageable with large diameter gears 26a,26b provided coaxially with the reel shafts 1a,1b. By the way, the meshing engagement between the gears 9a and 26a and that between the gears 9b and 26b are controlled respectively by the turning movements of the turnable levers 7a,7b. Both of the turnable levers 7a,7b are however urged by their corresponding tension springs 27a,27b in such directions that the gears 9a,9b are brought into meshing engagement with their corresponding gears 26a,26b. On the other hand, the turning movements of the turnable levers 7a,7b are controlled by the horizontal movement of the changeover bar 17. The turnable levers 7a,7b and changeover bar 17 are linked together in such a way that while one of the gears (for example, the right-hand gear 9a) is maintained in meshing engagement with the gear 26a, the other gear 9b is maintained out of engagement from the gear 26b.

Mounted on the reel shafts 1a,1b are rotary members 28a,28b which rotate together with their corresponding reel shafts 1a,1b. Pin-like pushing and urging portions 29a,29b are fixedly provided on the rotary members 28a,28b respectively. Friction mechanisms (see FIG. 28) are interposed between the reel shafts 1a,1b and the rotary members 28a,28b and between the reel shafts 1a,1b and the large diameter gears 26a,26b respectively. For example, the large diameter gear 26a can still be allowed to rotate even when the rotation of the reel shaft 1a is stopped. In this case, the corresponding friction mechanism undergoes slipping.

Now, one example of the structure of the above-described friction mechanisms will be described with reference to FIG. 28. Although each element of structure is designated by their corresponding reference numerals for both right-hand and left-hand rotation transmitting units, the reference numerals for the right-hand unit alone will hereinafter be referred to for the sake of simplicity.

Designated at numeral 501a indicates a base on which the reel shaft 1a is provided upright. A reel receiving body 531a is mounted for rotation on the reel shaft 1a and is prevented from being pulled off axially upwardly by a stopper (for example, an E-snap ring) 504a fitted at an upper end portion of the reel shaft 1a.

The reel receiving body 531a includes a cylindrical member 506a having a flange 505a at a lower end thereof, a cap 507a press-fitted at an upper end of the cylindrical body 506a, and a reel driving member 508a mounted for axial movement on an outer periphery of the cap 507a. The reel receiving body 531a further includes a pressure receiving member 532a located between the cap 507a and the large diameter gear 26a which is mounted for rotation around an outer periphery of the cylindrical member 506a above the flange 505a. In particular, the pressure receiving member 532a is located above the large diameter gear 26a and between a pair of axially opposing surfaces of the cap 507a and the flange 505a of the reel receiving body 531a.

The pressure receiving member 532a includes a flange portion 533a and a cylindrical portion 534a located on the flange portion 533a and is mounted on an outer periphery of the cylindrical member 506a with an engaging portion 535a at an upper end of the cylindrical portion 534a thereof engaged with a complementary engaging portion 507a-1 provided on the cap 507a. Here, the engagement between the engaging portions 535a and 507a-1 of the cylindrical portion 534a and the cap 507a, respectively, is such that the pressure receiving member 532a may move in the axial direction relative to the cap 507a and may rotate in an integral relationship with the cap 507a.

Friction members 536a,515a each in the form of a sheet such as a felt sheet are interposed between the flange portion 533a of the pressure receiving member 532a and the large diameter gear 26a and between the large diameter gear 26a and the flange 505a so that rotation of the large diameter gear 26a may be transmitted to the pressure receiving member 532a and the flange 505a, respectively.

A second spring member 537a is located between the pressure receiving member 532a and the cap 507a inside the cylindrical portion 534a of the pressure receiving member 532a so that its elastic force may urge the pressure receiving member 532a downwardly toward the large diameter gear 26a to provide press contacting forces between the flange portion 533a of the pressure receiving member 532a and the large diameter gear 26a and between the large diameter gear 26a and the flange 505a with the friction members 536a and 515a interposed therebetween, respectively. The second spring member 537a, the friction members 536a, 515a and the flange portion 533a of the pressure receiving member 532a constitute a friction transmission mechanism 538a for frictionally transmitting a turning force of the large diameter gear 26a to the reel receiving body 531a.

On the other hand, a friction coupling member 540a is mounted for rotation on an outer periphery of the cylindrical portion 534a above the flange portion 533a of the pressure receiving member 532a. The friction coupling member 540a has a disk portion 541a and a pushing and urging portion 29a extending radially outwardly from the disk portion 541a. The pushing and urging portion 29a of the friction coupling member 540a engages a mechanism (for example, the cam follower 31a of the automatic reverse mechanism) which operates responsive to each rotation or stopping of the reel receiving body 531a.

A further friction member 543a in the form of a sheet such as a felt sheet is interposed between the disk portion 541a of the friction coupling member 540a and the flange portion 533a of the pressure receiving member 532a, thereby constructing a reel stop detecting friction mechanism, and a first spring member 544a is interposed between an upper end surface of the disk portion 541a and the cap 507a. Thus, the elastic force of the first spring member 544a urges the friction coupling member 540a against the flange portion 533a of the pressure receiving member 532a via the friction member 543a. Accordingly, the turning force of the large diameter gear 26a is transmitted to the friction coupling member 540a to produce a pressing force against the pressure receiving portion 34a of the cam follower 31a, while yielding a slip between the friction member 543a and the disk portion 541a of the friction coupling member 540a.

According to the reel receiving device having such a construction as described above, when a tape reel (not shown) is loaded on the reel driving member 508a and the turning force of the capstan 3a is transmitted to the large diameter gear 26a by way of the gear 9a, the large diameter gear 26a will be rotated thereby, and such rotation of the large diameter gear 26a is transmitted to the reel receiving body 531a via the rotation transmitting mechanism 538a to drive the tape reel.

When a tape wound on the tape reel comes to its end subsequently, the rotation of the reel receiving body 503a is stopped, yielding a slip between the large diameter gear 26a and the friction member 515a and between the large diameter gear 26a and the friction member 536a. Consequently, the pressing force of the friction coupling member 540a against the cam follower 31a disappears so that the cam follower 31a will operate to reversely switch the running direction of the tape as will be described subsequently.

In the friction mechanism 538a, the press contacting force between the flange portion 533a of the pressure receiving member 532a and the large diameter gear 26a with the friction member 536a interposed therebetween and the press contacting force between the large diameter gear 26a and the flange 505a with the friction member 515a interposed therebetween are hence derived mainly from the second spring member 537a. On the other hand, the elastic force of the first spring member 544a acts to press the reel driving member 508a upwardly and also acts in a direction to enhance the press contacting force exerted in the friction mechanism 538a by the first spring member 537a.

Accordingly, the elastic force of the second spring member 537a can be increased to a degree sufficient to assure the operation of the friction mechanism 538a. Further, the elastic force of the first spring member 544a can be reduced to facilitate axial movement of the reel driving member 508a because it is merely required to provide, between the friction coupling member 540a and the pressure receiving member 532a, a frictional force sufficient to assure transmission of the pressing force of the friction coupling member 540a to the pressure receiving portion 34a of the cam follower 31a responsive to each rotation or stopping of the reel receiving body 531a.

It is hence possible to design the degrees of elasticity of the first and second spring members 544a,537a independently to their respective optimum values. Since the elastic force of the first spring member 544a can be designed to an optimum value as mentioned above, it is also possible to produce a sufficient pressing force against the friction coupling member 540a responsive to each rotation or stopping of the reel receiving body 532a, and it is accordingly feasible to effectively prevent the automatic reverse mechanism from operating in error.

It is to be noted that the structure around the reel shaft is not necessarily limited to such a structure as described above. For example, the reel driving member 508a and the cap 507a may be formed as an integral single body. In this instance, the first spring member 544a will act in two ways, one being to press the friction coupling member 540a against the pressure receiving member 532a via the friction member 543a and the other to enhance the press contacting force exerted in the friction mechanism 538a by the second spring member 537a.

It is also possible to integrate the cap 507a and the pressure receiving member 532a into a single body while omitting the friction member 536a between the cap 507a and the pressure receiving member 532a and also to extend the second spring member 537a between the cap 507a and the large diameter gear 26a. This modified structure will provide similar effects.

Designated at numeral 30 in FIG. 1 is a fixing plate, on which cam followers 31a,31b and auxiliary holding members 32a,32b are pivotally supported.

The cam followers 31a,31b have contact portions 33a,33b at locations farthest from their fulcrums, pressure receiving portions 34a,34b located respectively on the orbits of revolutions of the pushing and urging portions 29a,29b, and elastic fingers 35a,35b in the vicinity of the fulcrums.

On the other hand, the auxiliary holding members 32a,32b have a substantially L-like configuration. Lower arms 36a,36b are located outside the shafts 10a,10b, while upper arms 37a,37b are positioned in opposition to the elastic fingers 35a,35b of the cam followers 31a,31b.

Figure 5:
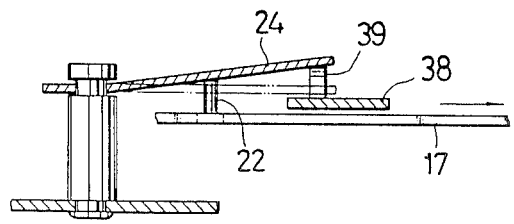
FIG. 5 is a cross-sectional view taken along line V—V in FIG. 4.

Numeral 38 indicates a stop lever provided displaceably back and forth across the changeover bar 17. The stop lever 38 serves as an interlocking member for determining the starting side of a cassette. The stop lever 38 has a bulge 39 at a part of the upper surface thereof and is normally biased in the retreating direction by a tension spring 40. When this stop lever 38 is caused to advance or retreat, the bulge 39 slides onto the lower surface of the turning end portion of the hook member 24 and lifts the hook member 24 in an upward direction as illustrated in FIG. 5. If the engagement pin 22 of the changeover bar 17 is in engagement with the engagement tab 24a of the hook member 24 at this time, their engagement is released owing to the upward displacement of the hook member 24.

The operation of the automatic reverse mechanism according to the first embodiment of this invention will next be described.

Figure 28:
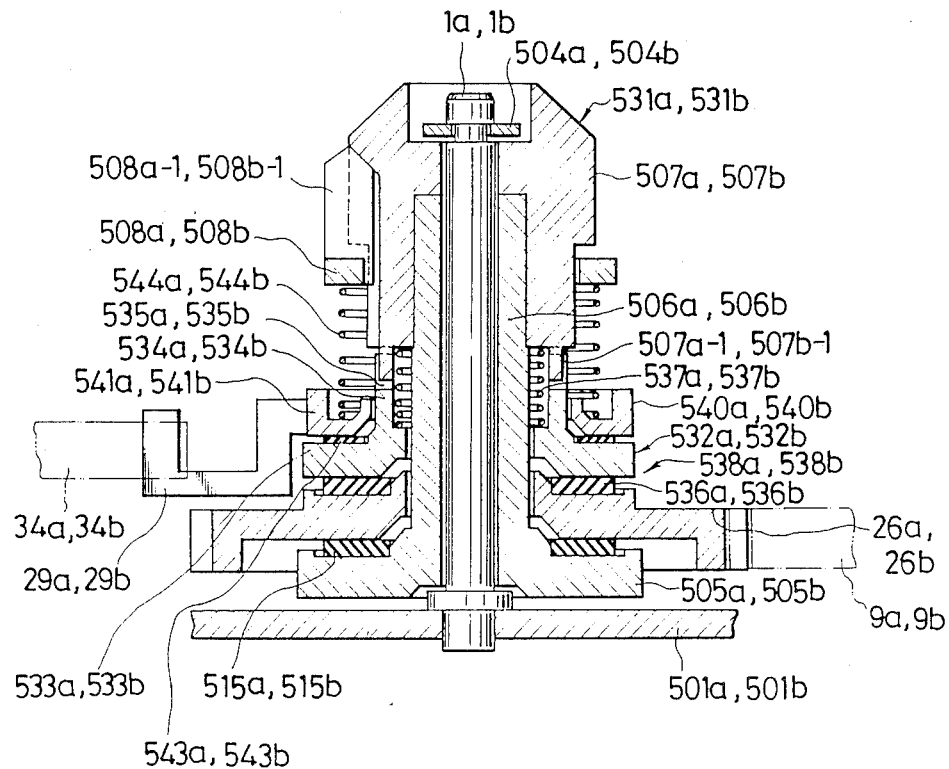
FIG. 28 is a detailed cross-sectional view of a friction mechanism which can be used commonly in the above embodiments of this invention for detecting each reel stop and for transmitting a rotary force.

In FIG. 1, the magnetic head 2 is held at the play position and at the same time, the right-hand pinch roller 4a is pressing the capstan 3a and the rotation of the capstan 3a, the direction of which is indicated by an arrow, is being transmitted via the gears 5a,8a,9a,26a and the friction mechanism shown by way of example in FIG. 28 to the right-hand reel shaft 1a so that a playback operation is being performed (note: the magnetic tape is omitted from the drawing).

At this time, the rotary force of the reel shaft 1a is being transmitted to the cam follower 31a by way of the pushing and urging portion 29a, whereby the contact portion 33a of the cam follower 31a is maintained in sliding contact with the cam surface 11a. So long as the contact portion 33a is maintained in sliding contact with the cam surface 11a in the above-described manner, the contact portions 33a is maintained out of contact with the cam 12a.

Since the left-hand reel shaft 1b serves as the paying-out side while the playback operation is performed with the tape being taken up on the right-hand reel shaft 1a in the above-described manner, the pushing and urging portion 29b is not pressing the pressure-receiving portion 34b of the cam follower 31b. In this state, the left-hand rotation transmitting unit (gears 8b,9b) has however been separated from the large diameter gear 26b to the non-engagement position relative to the reel shaft 1b. Accordingly, the lower arm 36b of the auxiliary holding member 32b is being pressed by the shaft 10b. As a result, the upper arm 37b of the auxiliary holding member 32b is pressing the elastic finger 35b of the cam follower 31b so that the auxiliary holding member 32b in place of the pushing and urging portion 29b maintains the contact portion 33b of the cam follower 31b in sliding contact with the cam surface 11b.

When the tape has been fully wound up on the right-hand reel, slipping is developed in the friction mechanism interposed between the large diameter gear 6a and the reel shaft 1a so that the reel shaft 1a stops. The contact portion 33a which has been kept in sliding contact with the cam surface 11a is hence separated from the cam surface 11a at a location where the contact portion 33a is closest to the shaft 10a and as illustrated in FIG. 2, the pushing and urging portion 12a is brought into contact with the contact portion 33a. Since the fulcrum of the cam follower 31a does not move, the rotation transmitting member, namely, the turnable lever 7a is hence caused to turn against the force of the spring 27a so that the gear 9a is separated from the large diameter gear 26a. As a result, the transmission of the rotary force to the large diameter gear 26a is stopped.

On the other hand, a turning movement of the turnable lever 7a causes the bent end portion 13a thereof to press the lug 19 of the changeover bar 17 from the right as shown in FIG. 3, thereby moving the changeover bar 17 leftwards. As a result, the engagement pin 22 provided on the changeover bar 17 is brought into engagement with the engagement tab 24a of the hook member 24 (see, FIG. 4).

Here, the left-hand inclined edge 21b of the changeover bar 17 releases the bracket 15b as depicted in FIG. 4. Conversely, the right-hand inclined edge 21a causes the bracket 15a to turn in a direction opposite to its biased direction. As a result, the left-hand pinch roller 4b is pressed against the capstan 3b while the right-hand pinch roller 4a is separated from the capstan 3a.

Further, the left-hand turnable lever 7b is pulled by the spring 27b and is hence caused to turn clockwise, whereby the small diameter gear 9b is brought into meshing engagement with the large diameter gear 26b in the same rotation transmitting unit.

As shown in FIG. 4, the automatic reverse mechanism therefore is brought into a state opposite to the state illustrated in FIG. 1. Hence, the left-hand reel shaft 1b is caused to rotate in the winding direction and a playback or recording operation is performed while the tape is being wound up on the left-hand reel.

When the tape has been taken up fully on the left-hand reel in the above-described manner, slipping takes place in the friction mechanism interposed between the large-diameter gear 26b and reel shaft 1b so that the reel shaft 1b stops. Accordingly, the contact portion 33b which has been kept in sliding contact with the cam surface 11b is caused to move closest to the shaft 10b and is then separated from the cam surface 11b, and similar to the operation shown in FIG. 2, the cam 12b is brought into contact with the contact portion 33b. Since the fulcrum of the cam follower 31b does not move once the above-described state is reached, the rotation transmitting unit, i.e., the turnable lever 7b is caused to turn against the force of the spring 27b so that the gear 9b is separated from the large diameter gear 26b. As a result, the transmission of the rotary force to the large diameter gear 26b is stopped (see, FIG. 1).

On the other hand, the bent end portion 13b of the turnable lever 7b presses the pressure receiving portion 24b of the hook member 24 from the left by the counterclockwise rotation of the turnable lever 7b, whereby the hook member 24 is caused to turn so as to release the engagement pin 22 from the engagement tab 24a. The changeover bar 17 is hence allowed to return in the rightward direction owing to the provision of the tension spring 23. As a consequence, the right-hand inclined edge 21a of the changeover bar 17 releases the bracket 15a as depicted in FIG. 1 while the left-hand inclined edge 21b causes the bracket 15b to turn in a direction opposite to the biased direction. The right-hand pinch roller 4a is therefore pressed against the capstan 3a and the left-hand pinch roller 4b is separated from the capstan 3b.

Further, the right-hand turnable lever 7a is pulled by the spring 27a and is caused to turn counterclockwise, whereby the small diameter gear 9a is brought into meshing engagement with the large diameter gear 26 in the same rotation transmitting unit and the tape is again caused to run in the rightward direction.

When it is desired to stop the playback operation, it is only necessary to push the stop lever 38. By this operation, the magnetic head 2 is caused to return to the stop, namely, eject position from the play position and at the same time, the tape-driving motor is stopped, thereby bringing the tape recorder into a stopped state. Description of this mechanism is however omitted here because it is commonly known.

On the other hand, the pushing of the stop lever 38 causes the bulge 39 provided with the stop lever 38 to slide onto the lower surface of the hook member 24 so that the hook member 24 is lifted as depicted in FIG. 5. If the automatic reverse device is at this time in the state shown in FIG. 4 in which the engagement pin 22 is maintained in engagement with the engagement tab 24a and the changeover bar 17 has been moved in the leftward direction, the engagement pin 22 is released from the engagement tab 24a by the upward displacement of the hook member 24 as a result of the sliding contact of the bulge 39 so that the changeover bar 17 is allowed to return in the rightward direction. Therefore, the tape is always allowed to run in the leftward direction when the next playback or recording operation is started.

The stop lever 38 has been described in the first embodiment as one example of the interlocking member for determining the starting side of the cassette. It is also possible to provide a play lever or recording lever with a function to release the hook member 24, so that when the previous operation was stopped during the rotation of the left-hand reel shaft, the changeover bar 17 is changed over in the rightward direction at the same time as the pushing of the play lever or recording lever.

FIG. 6 to FIG. 10 illustrate the automatic reverse mechanism according to the second embodiment of this invention, which is suitable for use in a tape recorder. The same elements of structure as those depicted in FIG. 1 to FIG. 5 are identified by the same reference numerals. Description of the same elements of structure is therefore omitted herein.

Figure 6:
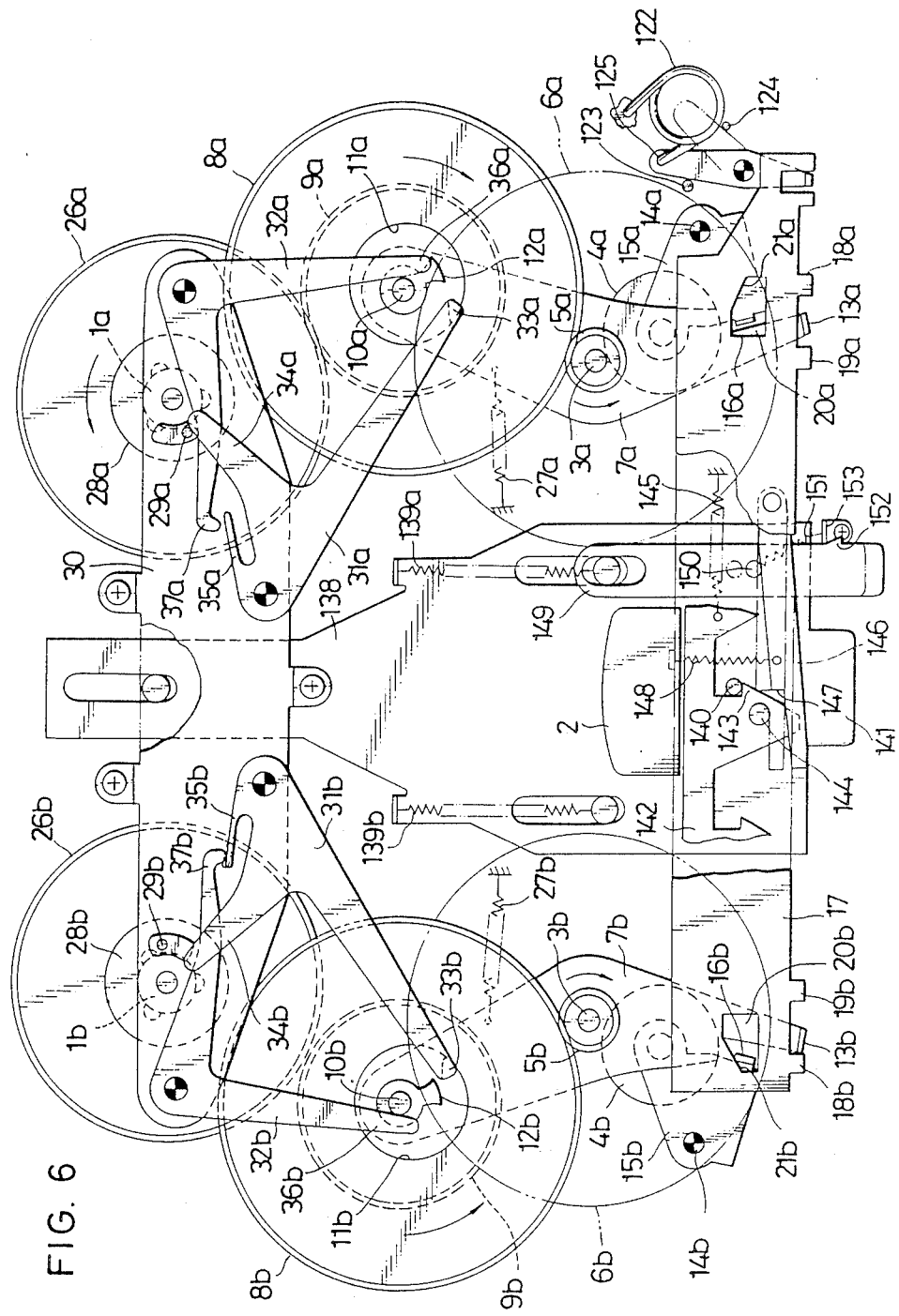

In the second embodiment, a two-state lever 125 which is pivotal in a two-state fashion between paired stopper pins 123 and 124 by a toggle spring 122 is provided in the vicinity of one end of the changeover bar 17 as shown in FIG. 6. These two-state lever 125 and toggle spring 122 constitute a pinch roller changeover mechanism together with the changeover bar 17. When the changeover bar 17 has moved, for example, in the leftward direction and the two-state lever 125 has been turned to a point beyond the neutral point, the changeover bar 17 is moved further in the leftward direction owing to the turning force of the two-state lever 125, whereby the right-hand pinch roller 4a is separated from the capstan 3a.

On the other hand, the magnetic head 2 is provided on a head mounting plate 138 which is displaceable back and forth in a direction perpendicular to the longitudinal direction of the changeover bar 17. The head mounting plate 138 is biased normally in the retreating direction (towards the stop, i.e., eject position) by means of two torsion springs 139a,139b. An engagement pin 140 as a locked member is provided upright at a rear end position on the upper surface of the head mounting plate 138. The rear end portion of the head mounting plate 138 forms a push button 141.

Underneath the changeover bar 17, there is provided a plate-like lock member 142 which is slidable horizontally in parallel with the changeover bar 17. The lock member 142 has a hook portion 143, which cooperates with the engagement pin 140. A pressure-receiving pin 144 is also provided on the upper surface of the lock member 142 at a position near the hook portion 143. The lock member 142 is normally urged by means of a torsion spring 145 in the rightward direction as viewed in the drawing.

A selector member 146 is also provided at a part of the changeover bar 17 with one end thereof secured pivotally on the changeover bar 17. This selector member 146 has, at the other end thereof, a stepped pressing portion 147 which is engageable with the pressure-receiving pin 144. The selector member 146 is pivotally urged by a torsion spring 148 in a direction where the stepped pressing portion 147 is brought into engagement with the pressure-receiving pin 144.

Designated at numeral 149 is a selector lever which is provided displaceably back and forth in a direction perpendicular to the length of the changeover bar 17. This selector lever 149 has a lock pin 150 and is normally urged by a torsion spring 151 in the retreating direction. The lock pin 150 engages the selector member 146 and holds the selector member 146 at a position where the selector member 146 is maintained out of engagement from the pressure-receiving pin 144. By pushing the selector lever 149 against the force of the spring 151, the selector member 146 is however caused to turn following the lock pin 150 so that the stepped pressing portion 147 is brought into engagement with the pressure-receiving pin 144 as indicated by an imaginary line in FIG. 6. Incidentally, the selector lever 149 has a hook portion 152 at a position on one of the side edges thereof. By bringing this hook portion 152 into engagement with a spring stud 153 on which the tension spring 151 is hooked, the selector lever 149 is held at its pushed position.

A description will next be made of the operation of the automatic reverse mechanism according to the second embodiment of this invention.

In FIG. 6, the head mounting plate 138 has moved forward and the engagement pin 140 has been brought into engagement with the hook portion 143 of the lock member 142, whereby the magnetic head 2 is held at the play position thereof. Furthermore, the right-hand pinch roller 4a is being pressed against the capstan 3a so that the rotation, the direction of which is indicated by an arrow, of the capstan 3a is transmitted to the right-hand reel shaft 1a by way of the gears 5a,8a,9a,26a and the same friction mechanisms as shown in FIG. 28. Accordingly, a playback mode is being performed there (note: the magnetic tape is omitted in the drawing).

When the playback mode is performed in the manner described above, the movements of the cam followers 31a,31b, the auxiliary holding members 32a,32b and the like are the same as those described above in connection with the first embodiment. Namely, the rotary force of the reel shaft 1a is transmitted at this time to the cam follower 31a via the pushing and urging portion 29a, thereby bringing the contact portion 33a of the cam follower 31a into sliding contact with the cam surface 11a. So long as the contact portion 33a is maintained in sliding contact with the cam surface 11a in the above-described manner, the contact portion 33a and cam 12a are not allowed to contact to each other.

When the playback mode is performed with the tape being wound up on the right-hand reel shaft 1a in the above-described manner, the left-hand reel shaft 1b serves as a releasing reel shaft. Therefore, the pushing and urging portion 29b is not pressing the pressure-receiving portion 34b of the cam follower 31b. In this state, the left-hand rotation transmitting unit (the gears 8b,9b) have however already separated from the large diameter gear 26 and moved to the nonengagement position relative to the reel shaft 1b, so that the lower arm 36b of the auxiliary holding member 32b. is being pressed by the shaft 10b. The upper arm 37b of the auxiliary holding member 32b is hence pressing the elastic finger 35b of the cam follower 31b, whereby the auxiliary holding member 32b instead of the pushing and urging portion 29b is holding the contact portion 33b of the cam follower 31b in sliding contact with the cam surface 11b.

When the tape has been fully wound up on the right-hand reel, slipping takes place in the friction mechanism interposed between the large diameter gear 6a and reel shaft 1a so that the reel shaft 1a stops. The contact portion 33a which has been maintained in sliding contact with the cam surface 11a is then separated from the cam surface 11a at a position closest to the shaft 10a, so that the cam 12a is brought into contact with the contact portion 33a as shown in FIG. 2 of the first embodiment. Since the fulcrum of the cam follower 31 does not move, the rotation transmitting member, namely, the turnable lever 7a is caused to turn against the force of the spring 27a to separate the gear 9a from the large diameter gear 26a. As a result, the transmission of the rotary force to the large diameter gear 26a is stopped.

Figure 7:
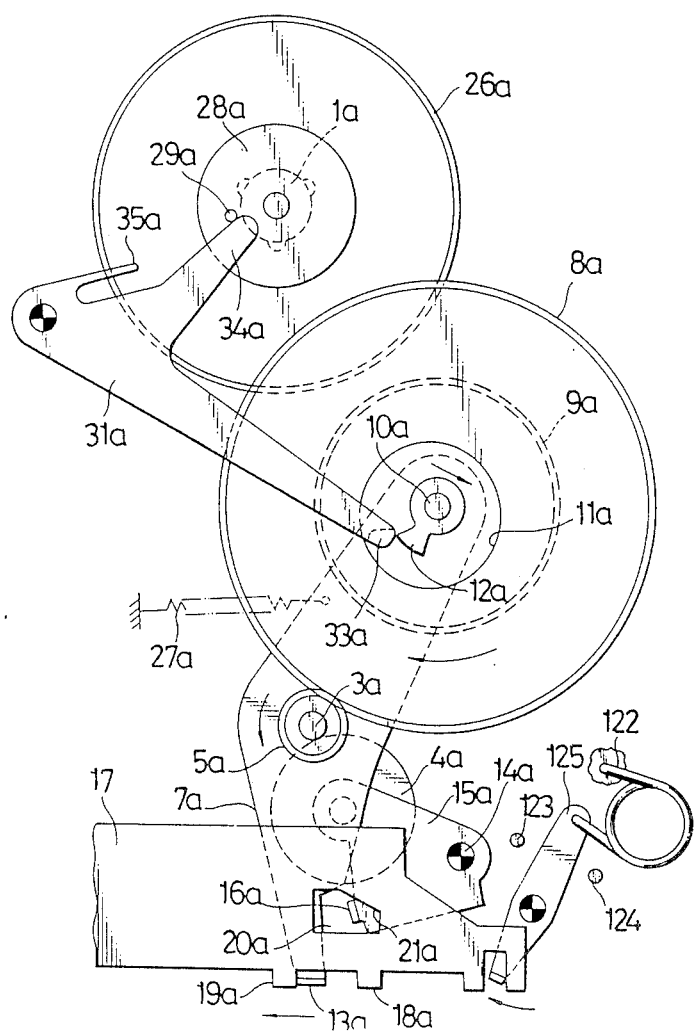
FIG. 6 to FIG. 10 schematically show the structure of an automatic reverse mechanism according to a second embodiment of this invention.

Further, the turning movement of the turnable lever 7a causes the bent end portion 13a of the turnable lever 7a to press a lug 19a of the changeover bar 17 form the right as illustrated in FIG. 7, so that the changeover bar 17 is moved in the leftward direction. In response to the leftward movement of the changeover bar 17, the two-state lever 125 is caused to turn clockwise while compressing the toggle spring 122. As soon as the toggle spring 122 is moved beyond the neutral point, the spring force of the spring 122 acts in the direction that the two-state lever 125 is turned further in the clockwise direction. Hence, the changeover bar 17 is caused to move rapidly in the leftward direction.

Figure 8:
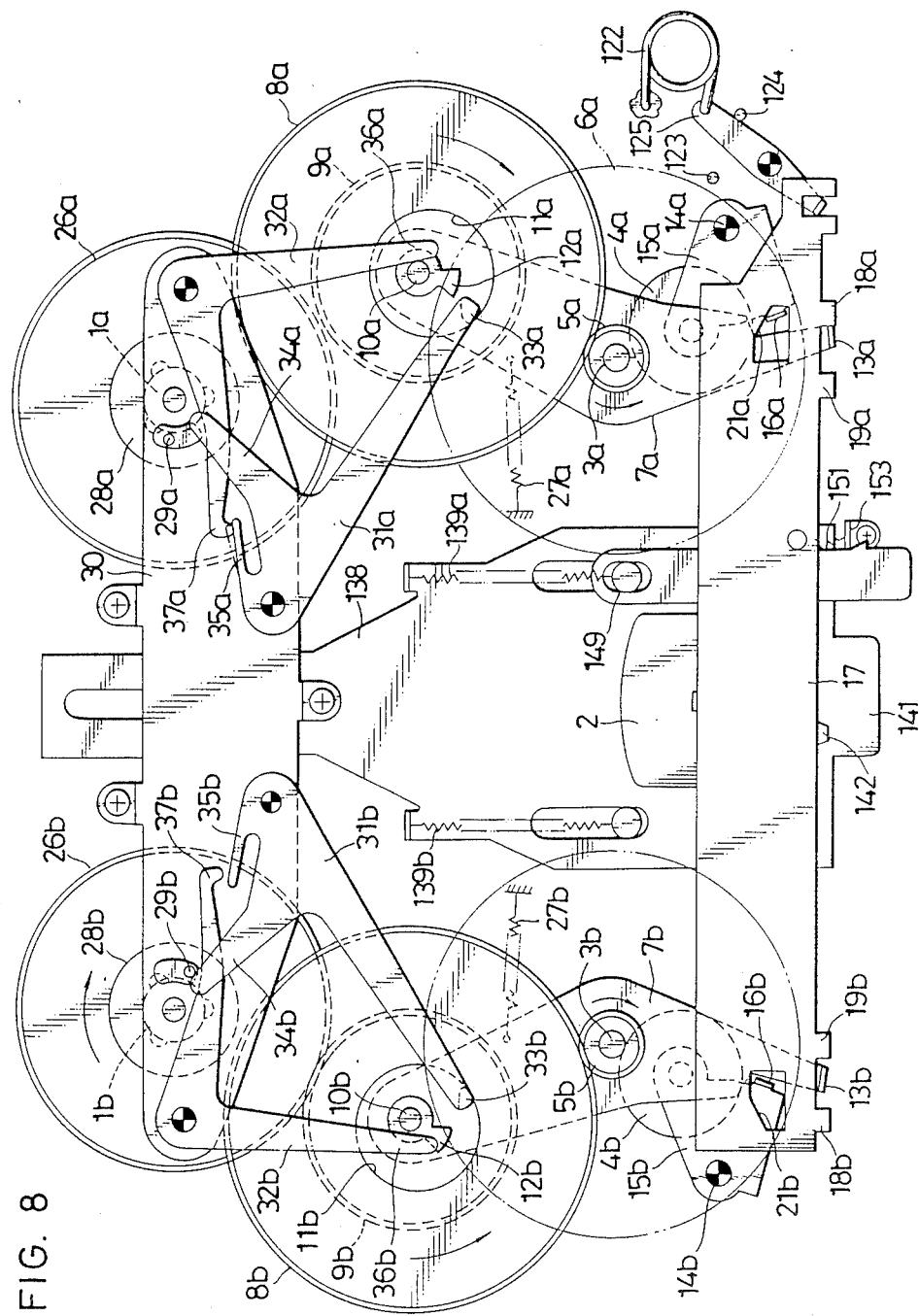

At this time, the left-hand inclined edge 21b of the changeover bar 17 releases the bracket 15b as shown in FIG. 8 while the right-hand inclined edge 21a causes the bracket 15a to turn in the direction opposite to its urged direction. As a result, the left-hand pinch roller 4b is pressed against the capstan 3b and the right-hand pinch roller 4a is separated from the capstan 3a.

Further, the left-hand turnable lever 7b is turned clockwise under the pulling force of the spring 27b, whereby the small diameter gear 9b of the rotation transmitting unit is brought into meshing engagement with the large diameter gear 26b in the same rotation transmitting unit.

As illustrated in FIG. 8, the automatic reverse mechanism has thus been brought into a state opposite to that shown in FIG. 6. A playback or recording mode is performed while the left-hand reel shaft 1b is rotating in the winding direction and the tape is being wound up on the left-hand reel.

In the above-described operation, the reversing operation of the magnetic tape is carried out repeatedly. When it is desired to stop this operation, it is only necessary to cause the lock member 142 to move in the leftward direction as viewed in the drawings against the force of the spring 145 by a predetermined stopping operation so that the hook portion 143 is released from the engagement pin 140 to allow the head mounting plate 138 to return to the retreated position.

When it is desired to automatically stop the tape recorder in a playback or recording mode when the magnetic tape has been fully wound up on the right-hand reel, it is only necessary to push the selector lever 149.

Figure 9:
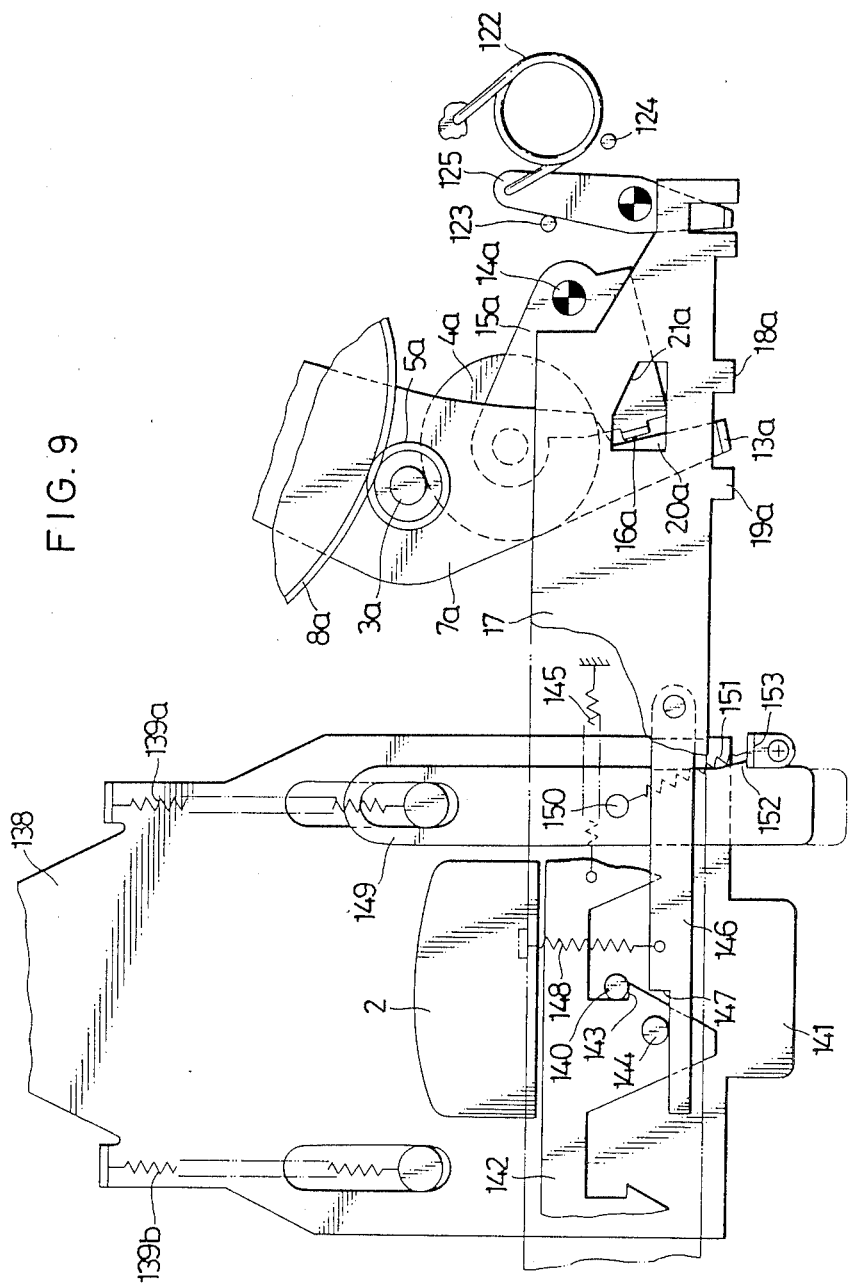
Figure 10:
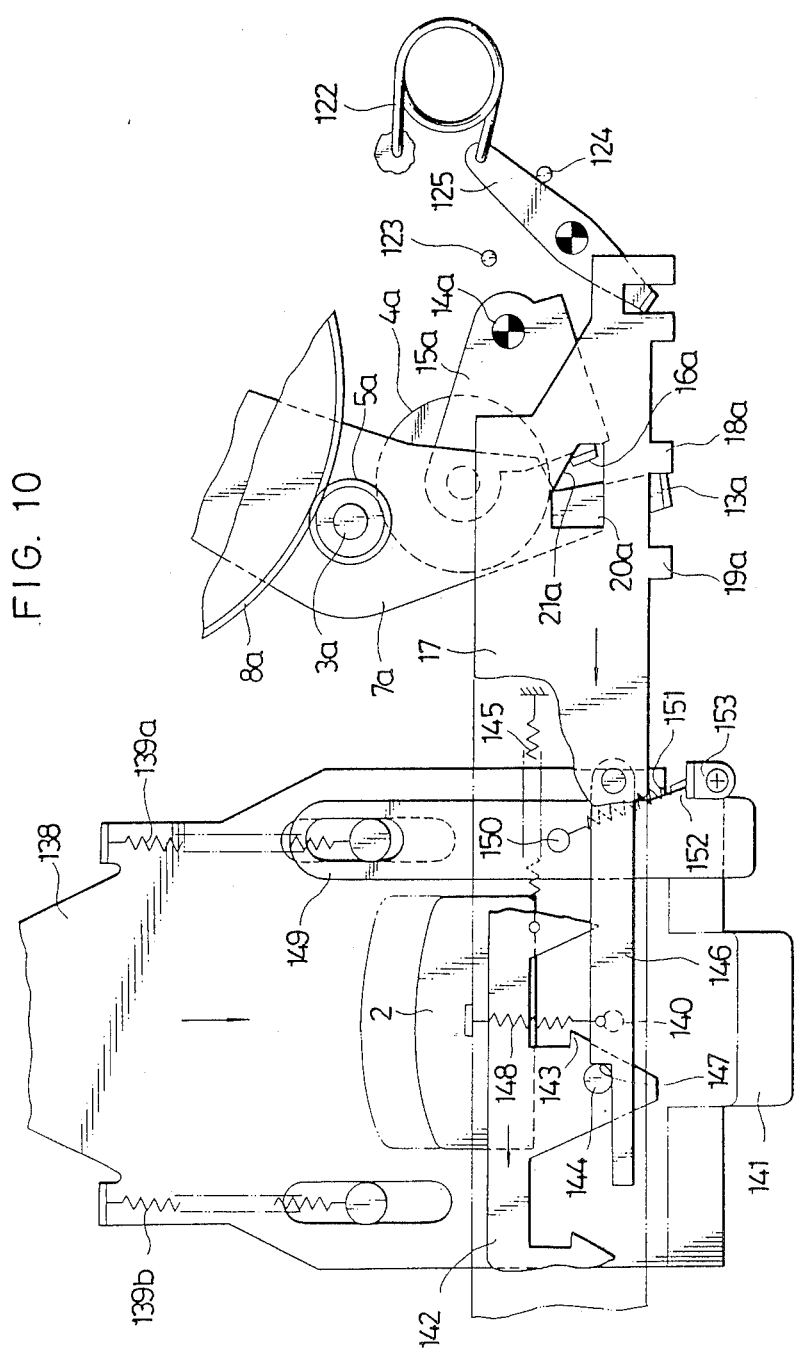

When the selector lever 149 is pushed to bring the hook portion 152 into engagement with the spring stud 153 as depicted in FIG. 9, the selector member 146 is caused to turn by the spring 148 following the lock pin 150 so that the stepped pressing portion 147 assumes a position on a side of the pressure-receiving pin 144 provided on the lock member 142.

The magnetic tape is wound fully on the right-hand reel in the above-described state. When the changeover bar 17 has moved in the leftward direction, the stepped pressing portion 147 pushes the pressure-receiving pin 144 in the leftward direction. Accordingly, the lock member 142 is caused to move leftwards to release the hook portion 143 from the engagement pin 140. As a result, the head mounting plate 138 is hence retreated by the springs 139a,139b so that the magnetic head 2 is caused to return to the stop, i.e., eject position.

Since the changeover bar 17 has moved to the left when the tape recorder was automatically stopped by pushing the selector lever 149, the left-hand reel always serves as a winding reel when a next playback or recording operation is started. Therefore, the magnetic tape runs in the leftward direction.

As an alternative, the play or recording lever may be allowed to return to its original position when the selector member has moved together with the changeover lever (i.e., pinch roller changeover member) to urge the engagement pin (locked portion), whereby the magnetic head is caused to return to its stop, i.e., eject position.

Figure 11:
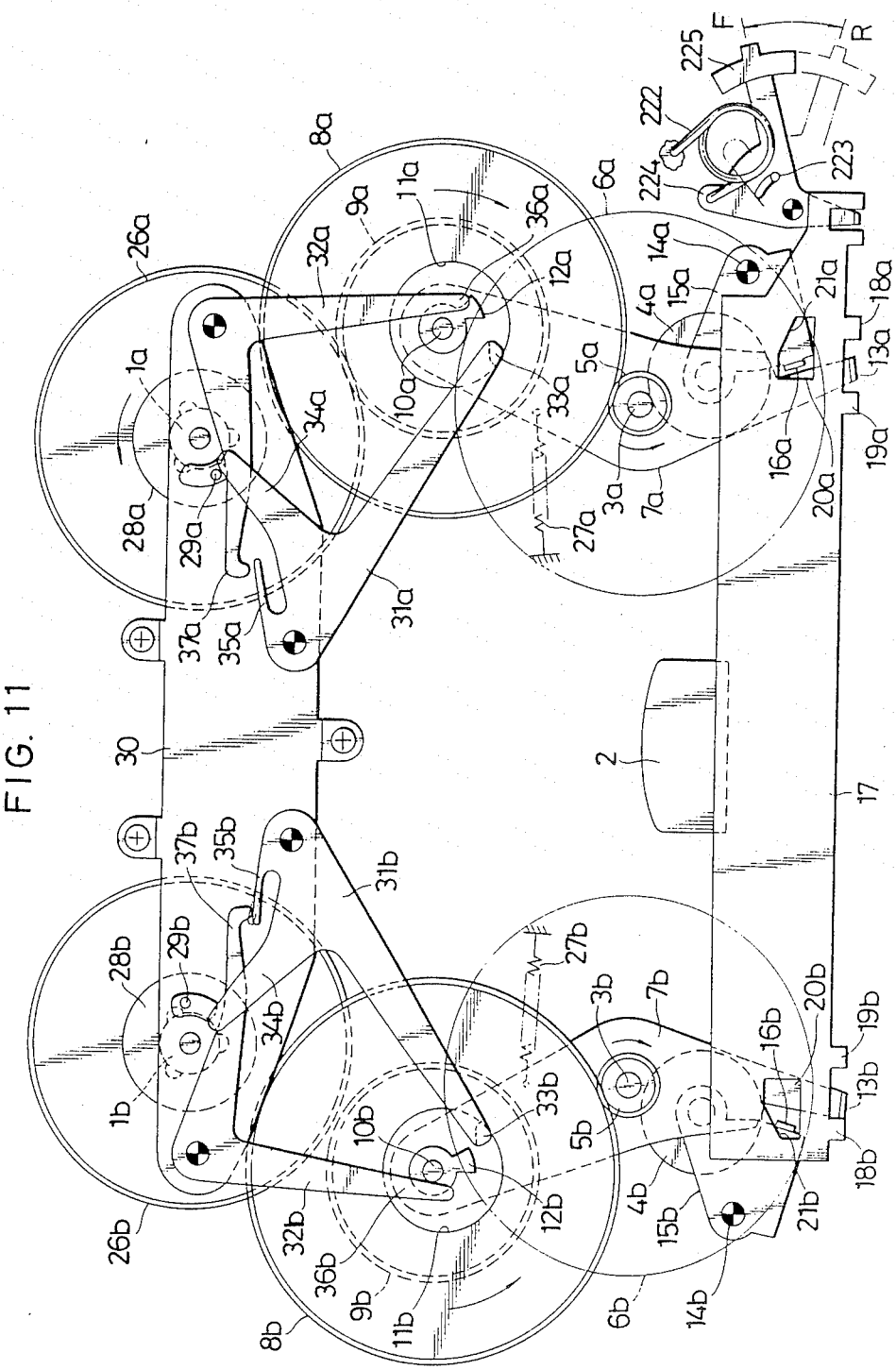
FIG. 11 to FIG. 12 schematically show the structure of an automatic reverse mechanism according to a third embodiment of this invention.
Figure 12:
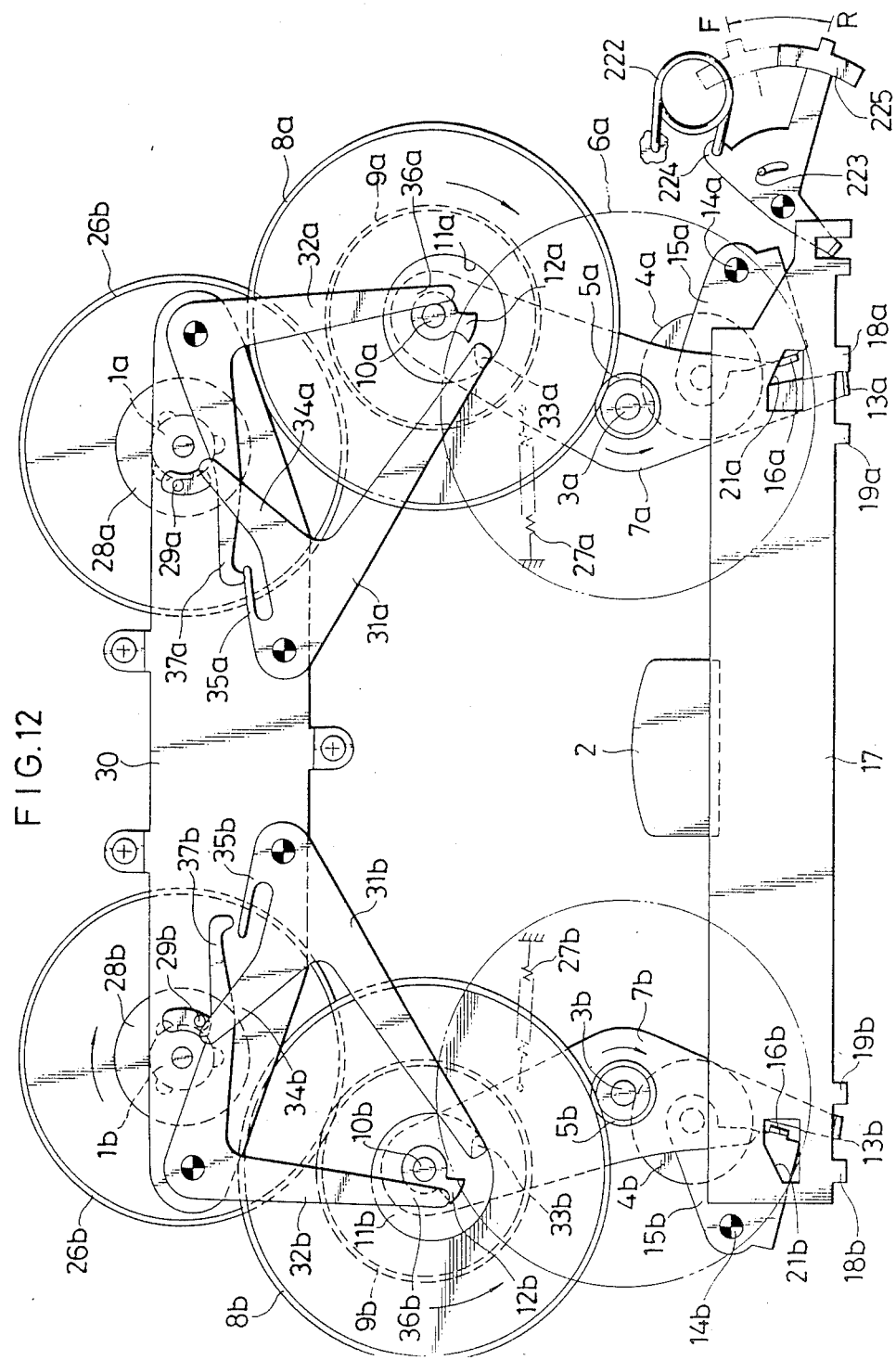

FIG. 11 and FIG. 12 show the third embodiment of this invention. The same elements of structure as those depicted in FIG. 1 to FIG. 10 are identified by the same reference numerals. Description of the same elements of structure is therefore omitted herein.

In the third embodiment, a two-state plate 224 which is pivotal by a toggle spring 222 in a two-state fashion within a range defined by a stopper pin 223 is connected in the vicinity of one end of the changeover bar 17. These two-state plate 224 and toggle spring 222 constitutes a pinch roller changeover mechanism together with the changeover bar 17. When the changeover bar 17 has moved, for example, in the leftward direction and the two-state plate 224 has turned to a point beyond the neutral point, the changeover bar 17 is moved further in the leftward direction owing to the spring force of the two-state plate 224. As a result, the right-hand pinch roller 4a is separated from the capstan 3a. Namely, they exhibit the same function as the toggle spring 122, stopper pins 123,124 and two-state lever 125 in the second embodiment (see, FIG. 6).

In addition, a tape running direction indicator 225 is fixedly attached to the two-state plate 224. On the outer casing (not illustrated) of the tape recorder, an indicator for indicating the position of the tape running direction indicator 225, in other words, the running direction of the magnetic tape such as "F" and "R" is also provided.

Owing to the above-described construction, the automatic changeover of the running direction of the tape can be performed in the same principle as the second embodiment, namely, the embodiment illustrated in FIG. 6 through FIG. 10. In the third embodiment, the tape running direction indicator 225 is at the "F" position as shown in FIG. 11 while the pinch roller 4a is being pressed against the capstan 3a and the tape is running in the rightward direction. So long as the pinch roller 4b is being pressed against the capstan 3b and the tape is running in the leftward direction, the tape running direction indicator 225 is maintained at the "R" position as depicted in FIG. 12. Since the tape running direction indicator 225 connected to the changeover bar 17 can therefore indicate the running direction of the tape, it is possible to find out immediately in which direction the tape is running, in other words, whether the tape is running leftwards or rightwards by simply taking a look at the tape running direction indicator 225 even in such an application mode that the magnetic tape, reel shafts and the like are not visible from the outside as in the case of their use in a state assembled in a vehicle. This is extremely convenient. Moreover, the running direction of the tape can be manually changed over by manually turning the indicator 225 clockwise or counterclockwise as the case may be.

FIG. 13 to FIG. 16 show the fourth embodiment of this invention. The same elements of structure as those depicted in FIG. 1 to FIG. 12 are identified by the same reference numerals. Description of the same elements of structure is therefore omitted herefrom.

In the fourth embodiment, a fast feeding mechanism is additionally incorporated in the third embodiment described above.

Figure 13:
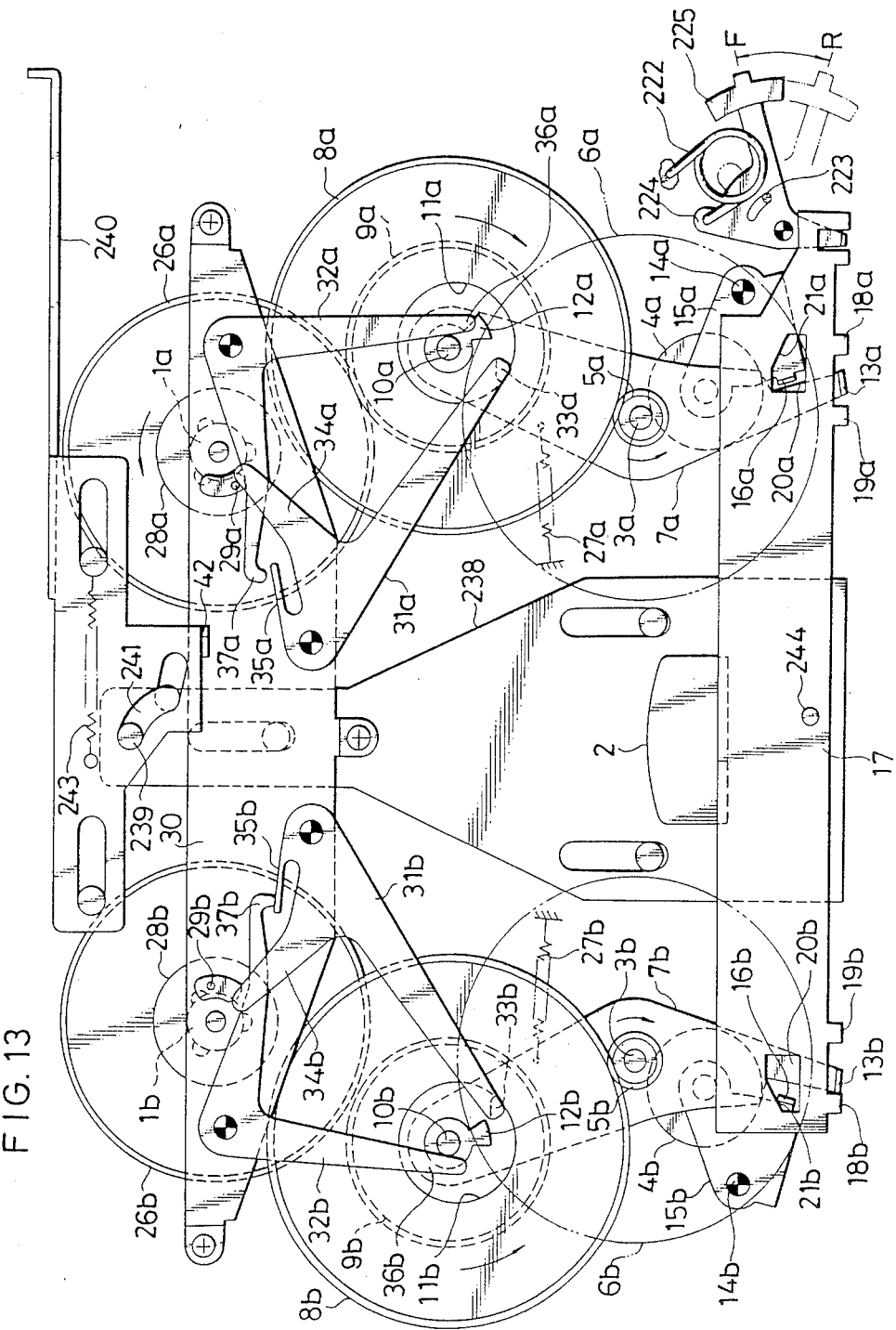
FIG. 13 to FIG. 16 schematically depict the structure of an automatic reverse mechanism according to a fourth embodiment of this invention.

Designated at numeral 238 in FIG. 13 is a head mounting member with the magnetic head 2 mounted thereon, which is provided displaceably back and forth in a direction perpendicular to the length of the changeover bar 17. A cam pin 239 projects from an end portion of the head mounting member 238. The cam pin 239 is fit in a cam slot 241 of a fast feeding control member 240 which is provided displaceably in the horizontal direction. The fast feeding member 240 has an engagement jaw 242 at a position near the cam slot 241 and is normally urged by a tension spring 243 in the rightward direction as viewed in the drawing. Owing to the spring force of the spring 243, the head mounting plate 238 is urged toward the play position where the magnetic head 2 is maintained in contact with the magnetic tape.

Figure 14:
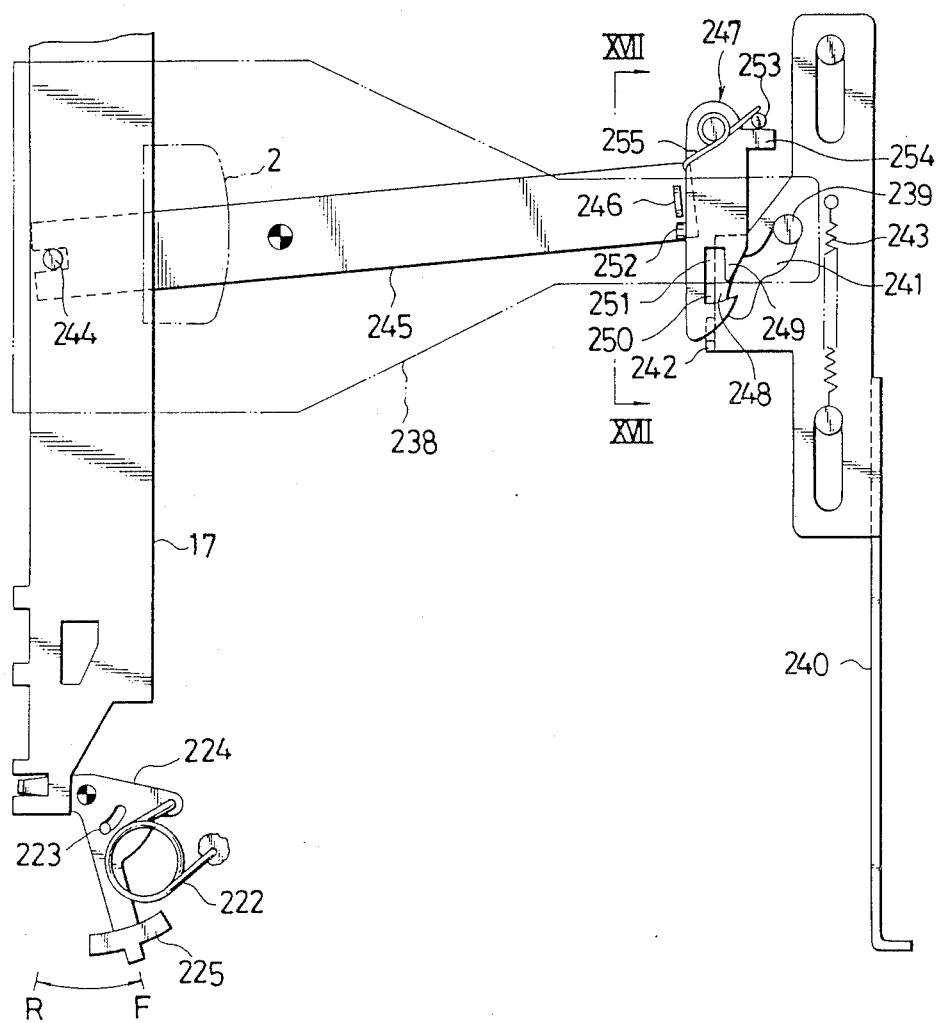
Figure 15:
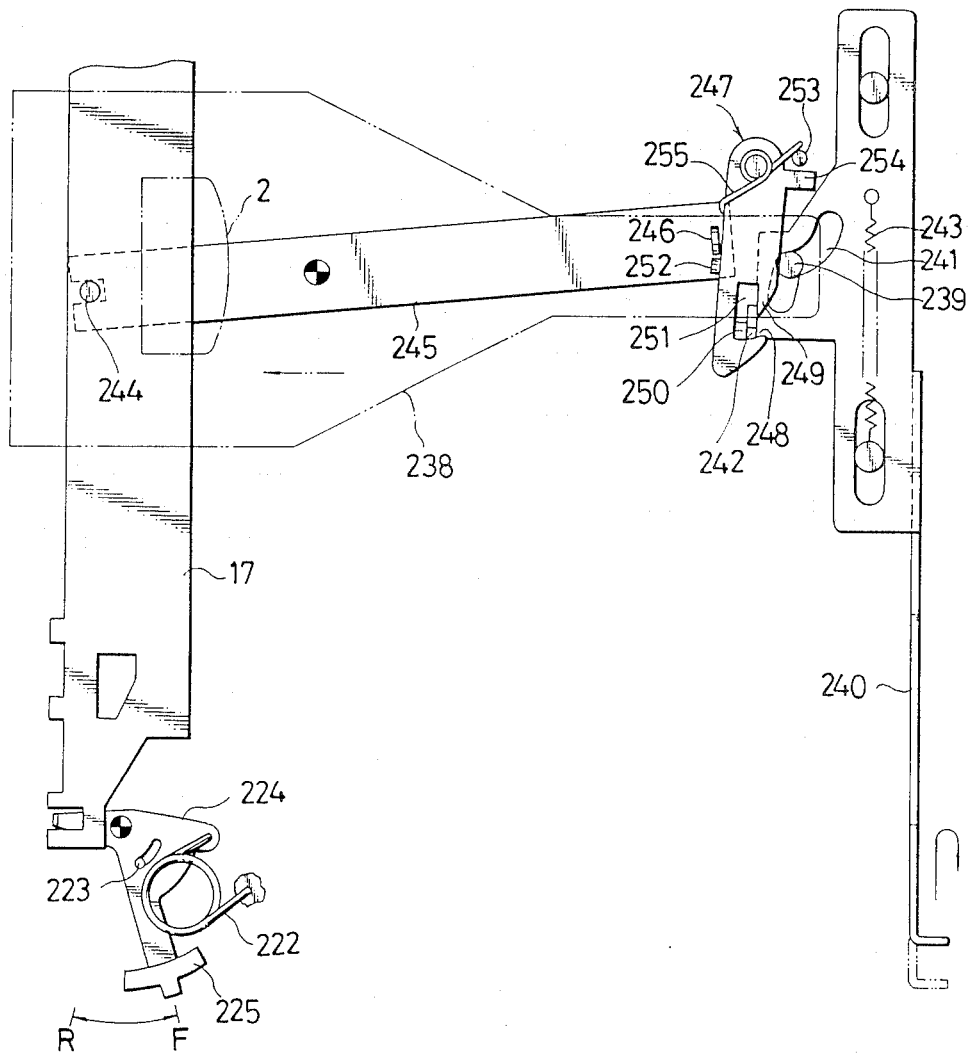
Figure 16:
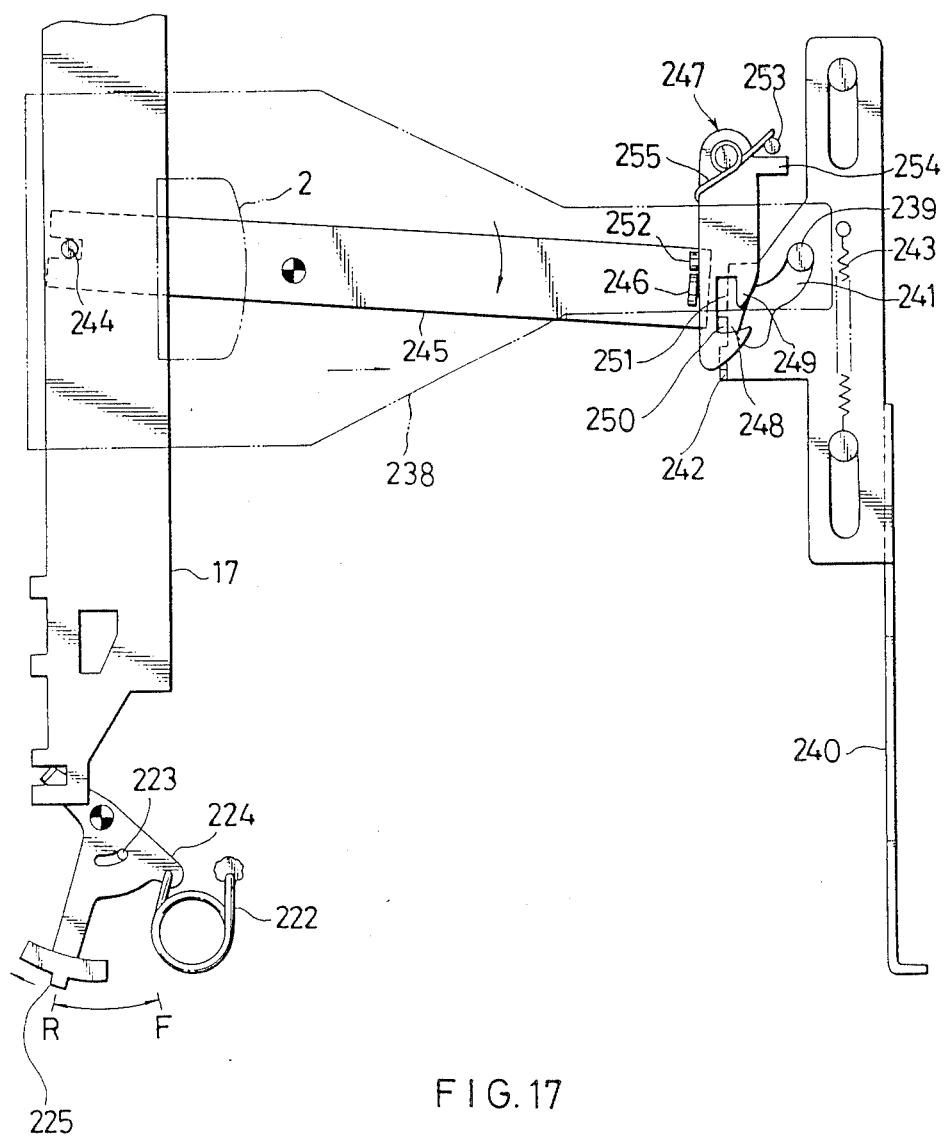

On the other hand, an engagement pin 244 is provided upright at a central part of the changeover bar 17. As illustrated in FIG. 14 to FIG. 16, one end of an interlocking member 245 is fit over the pin 244. The interlocking member 245 is pivotally supported at a central part thereof on a base (not illustrated) of the tape recorder and is equipped at the other end thereof with a bulge 246.

Numeral 247 indicates a hook member in FIG. 14 to FIG. 17. This hook member 247 defines an engagement recess 248 engageable with the engagement jaw 242 to lock the fast feeding control member 240 at its pushed position, a stopper portion 249 formed in opposition to the engagement recess 248, an inclined edge portion 250 formed in adjacent to the engagement recess 248, a release recess 251 confronting the inclined edge portion 250, a sliding lug 252 located on the moving line of the bulge 246 of the interlocking member 245, and a projection 254 which may be brought into contact with a stopper pin 253 provided on the fixing plate (not shown) so as to limit the range of the turning motion of the hook member 247. The hook member 247 is normally biased by a spring 255 in the counterclockwise direction as viewed in the drawings.

Owing to the above-described construction, the automatic reverse mechanism according to the fourth embodiment of this invention can perform the automatic changeover of the running direction of a tape in the same principle as the mechanism shown in FIG. 11 to FIG. 12 and moreover, permits a fast feeding operation.

When it is desired to perform a fast feeding operation of the tape, it can be achieved in the following manner. Namely, the fast feeding control member 240 is pushed as shown in FIG. 15 so that the engagement jaw 242 is brought into engagement with the engagement recess 248 of the hook member 247. Thereafter, the finger is removed from the fast feeding control member 240. Here, the cam pin 239 provided on the head mounting plate 238 moves along the cam slot 241 of the fast feeding member 240 so that the head mounting member 238 is allowed to retreat to separate the magnetic head 2 from the magnetic tape. At the same time, both left-hand and right-hand brackets 15a,15b cause the pinch rollers 4a,4b to separate from the capstans 5a,5b in response to the retreating motion of the head mounting member 238. As a result, the tape is allowed to run at a fast speed in the same direction so that the fast feeding operation is performed.

In order to have the tape recorder return from this fast feeding mode to the playback or recording mode, there are the following two methods.

When it is desired to return to the playback or recording mode without changing the running direction of the tape, it is necessary to push the fast feeding control member 240 again. As a result, the engagement jaw 242 of the fast feeding control member 240 is released from the engagement recess 248 and is then caused to move into the release recess 251 to assume a position in front of the inclined edge portion 250. Upon simple removal of the finger, the engagement jaw 242 moves along the lower surface of the inclined edge portion 250 so that the engagement jaw 242 separates from the hook member 247, thereby allowing the fast feeding control member 240 to return to the position shown in FIG. 14. Therefore, the tape recorder has been changed from the fast feeding mode to the playback or recording mode again.

Figure 17:
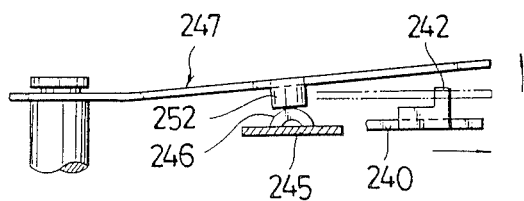
FIG. 17 is a cross-sectional view taken along line XVII—XVII in FIG. 14.

When it is desired to change the tape recorder to the playback or recording mode by changing the running direction of the tape on the other hand, it is only necessary to change the tape running direction indicator 225 in the clockwise or counterclockwise direction. Owing to the resulting sliding movement of the changeover bar 17, the interlocking member 245 is caused to rotate. Here, the bulge 246 of the interlocking member 245 is brought into sliding contact with the sliding lug 252 as shown in FIG. 17 so as to lift the hook member 247. The engagement jaw 242 of the fast feeding control member 240 is hence released from the engagement recess 248 of the hook member 247, thereby allowing the fast feeding control member 240 to return to the position shown in FIG. 14. Since the changeover bar 17 is also moved in the above-described operation, the running direction of the tape is changed over to perform a playback or recording operation.

When such an automatic reverse mechanism is incorporated in a cassette tape recorder, the above-described fast feeding control member 240 may also be provided with the cassette-ejecting function Namely, it may be designed to allow the fast feeding control member 240 to be pushed beyond its position depicted in FIG. 15 and to actuate the eject mechanism by the extra pushing stroke.

The changeover bar 17 may also be moved by a separate member instead of moving it directly by the members which carry the rotation transmitting units. In addition, the tape running direction indicator 225 is not limited to the pivotal structure shown in the above-described fourth embodiment but may take the horizontally sliding structure or may be composed of a pair of members provided respectively at both ends of the two-state member 224.

Figure 18:
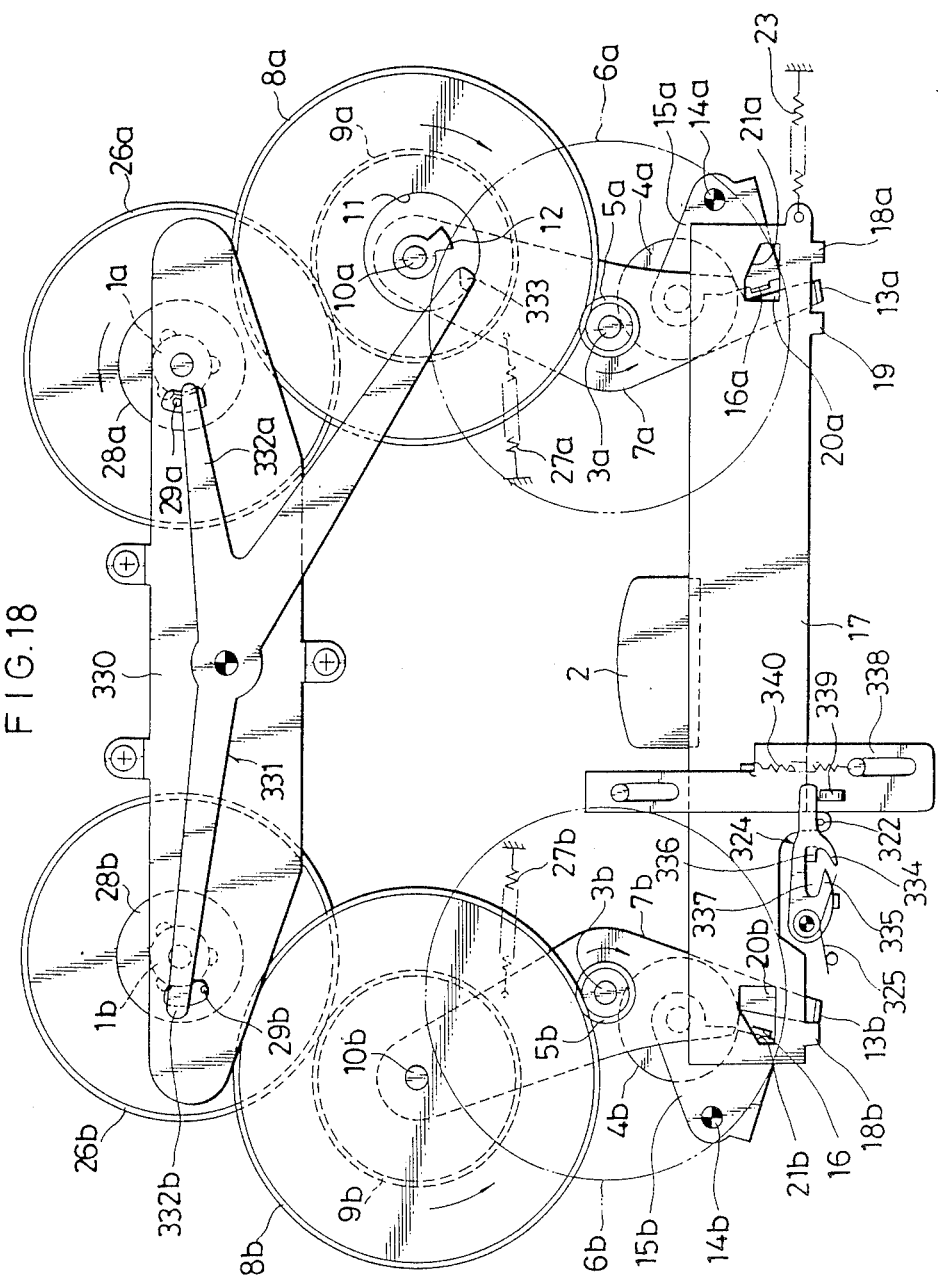
FIG. 18 to FIG. 21 schematically illustrate the structure of an automatic reverse mechanism according to a fifth embodiment of this invention.
Figure 19:
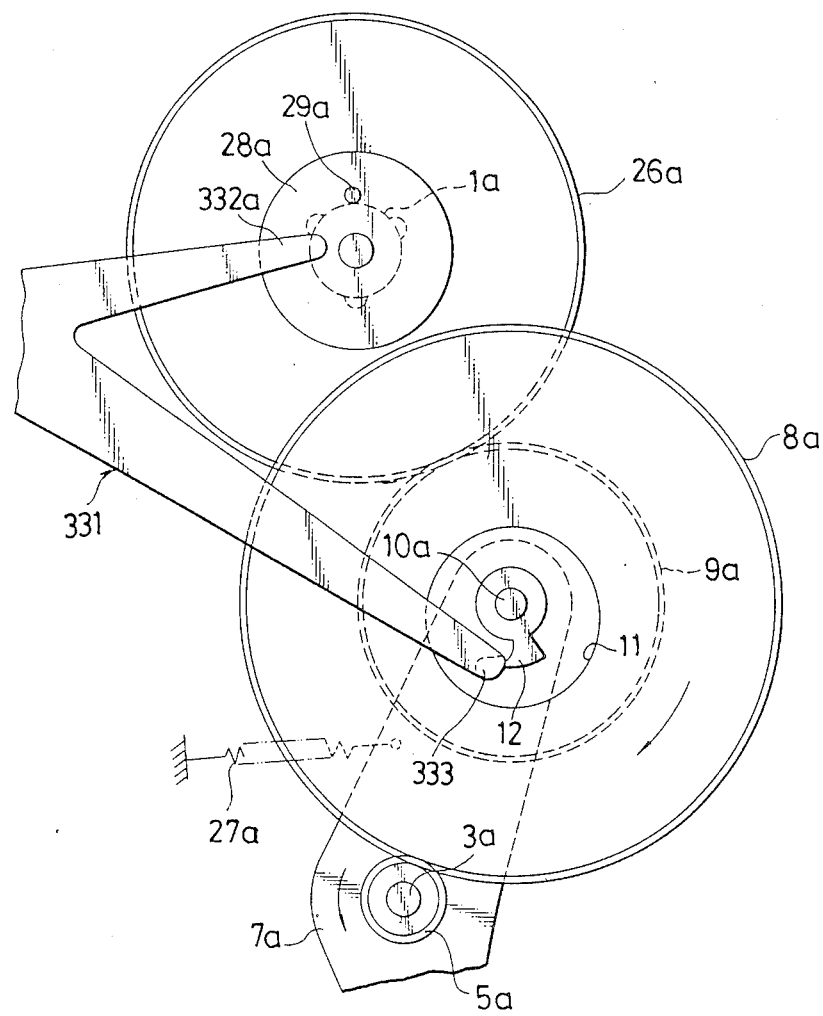
Figure 20:
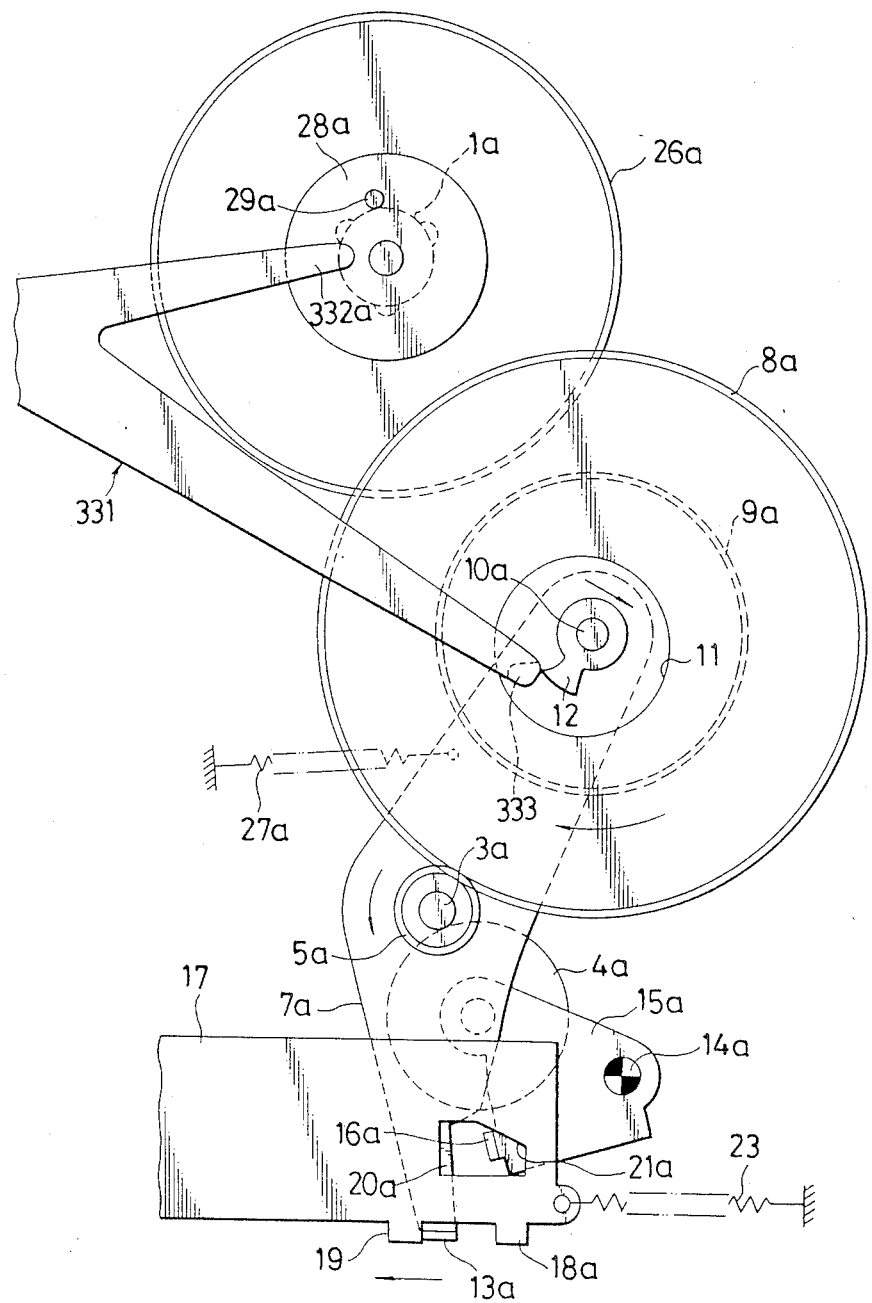

FIG. 18 to FIG. 21 illustrate the fifth embodiment of this invention. In FIG. 18, the right-hand reel shaft 1a is rotating. The left-hand reel shaft 1b is rotating in FIG. 21. FIG. 19 and FIG. 20 illustrate the automatic reverse mechanism in the course of its change from the state shown in FIG. 18 to its state depicted in FIG. 21.

In these figures, the same elements of structure as those in the first embodiment (FIG. 1 to FIG. 5) are identified by the same reference numerals. Description of the same elements of structure is therefore omitted herein.

In the fifth embodiment, an eccentric circular cam surface 11 is formed about the shaft 10a of the large diameter gear 8a on one side only. In addition, a cam 12 projects from and in continuation with the shaft 10a at the position where the eccentric circular cam surface 11 has the maximum radius.

Further, an engagement pin 322 projects out from a part of the changeover bar 17. At a position near the changeover bar 17, a hook member 324 is provided turnably. This hook member 324 is urged clockwise as viewed in the drawings by a spring 325 provided at the fulcrum of its pivotal movement.

Numeral 330 indicates a fixing plate, on which a cam follower 331 is pivotally supported. This cam follower 331 has pressure receiving arms 332a,332b corresponding respectively to the pressing and urging members 29a,29b. In addition, a third arm extends toward the eccentric circular cam surface 11, and a contact portion 333 which can undergo sliding contact with the eccentric circular cam surface 11 is provided at an end portion of the third arm.

The hook member 324 is provided with its free end directed toward the right. By the spring force of the spring 325, the free end of the hook member 324 is normally maintained in engagement with the engagement pin 322. The hook member 324 defines a locking recess 334 engageable with the engagement pin 322 so as to hold the changeover bar 17 at the leftwardly-moved position thereof, a stopper portion 335 confronting the locking recess 334, an inclined portion 336 located in adjacent to the locking recess 334, and a release recess 337 opposing the inclined portion 336.

Designated at numeral 338 is a stop lever provided displaceably back and forth at a right angle with respect to the changeover bar 17. This stop lever 338 has a bulge 339 at a part of the upper surface thereof and is normally urged in the retreating direction by a torsion spring 340. When this stop lever 338 advances and retreats, the bulge 339 slides on the lower surface of the free end portion of the hook member 324 so as to lift the hook member 324 upwards. If the engagement pin 322 of the changeover bar 17 is in engagement with the locking recess 334 of the hook member 324 at this time, their engagement is released as a result of the upward displacement of the hook member 324.

The operation of the automatic reverse mechanism according to the fifth embodiment will next be described.

In FIG. 18, the magnetic head 2 is maintained at the play position and the right-hand pinch roller 4a is being pressed against the capstan 3a. The rotation of the capstan 3a, the direction of which is indicated by an arrow, is being transmitted to the right-hand reel shaft 1a by way of the gears 5a,8a,9a,26a and the same friction mechanisms as shown in FIG. 28, whereby a playback operation is under way (note: the magnetic tape is omitted in the drawing).

In the above state, the rotary force of the reel shaft 1a is transmitted to the pressure-receiving arm 332a of the cam follower 331 via the pushing and urging portion 29a so that the contact portion 333 of the cam follower 331 is brought into sliding contact with the cam surface 11. So long as the contact portion 333 is maintained in sliding contact with the cam surface 11 in the above manner, the contact portion 333 and cam 12 are maintained out of contact.

When the tape has been fully wound up on the right-hand reel, slipping takes place in the friction mechanism interposed between the large diameter gear 26a and reel shaft 1a and the reel shaft 1a stops accordingly. At this time, the contact portion 333 which has been maintained in sliding contact with the cam surface 11 is separated from the cam surface 11 at a position closest to the shaft 10a and as shown in FIG. 19, the cam 12 is then brought into contact with the contact portion 333. Since the fulcrum of the cam follower 331 does not move, the rotation transmitting unit, namely, the turnable lever 7a is caused to turn against the force of the spring 27a so that the gear 9a is separated from the large diameter gear 26a. As a result, the transmission of the rotary force to the large diameter gear 26a is stopped.

On the other hand, by the turning of the turnable lever 7a, the bent end portion 13a of the turnable lever 7a pushes the lug 19 of the changeover bar 17 from the right as shown in FIG. 20 whereby the changeover bar 17 is moved in the leftward direction. As a result, the engagement pin 322 provided on the changeover bar 17 is brought into engagement with the locking recess 334 of the hook member 324 (FIG. 21).

Figure 21:
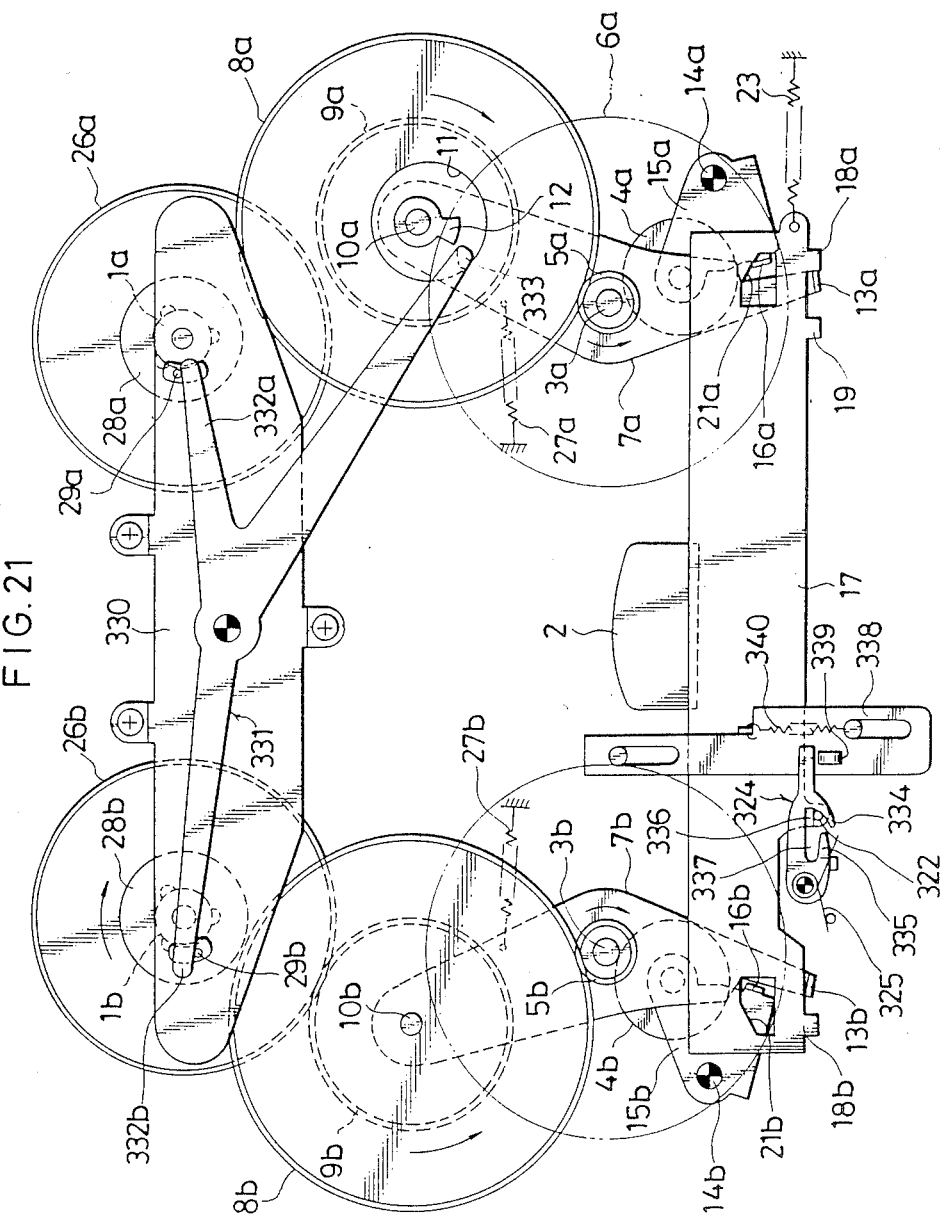

At this time, as shown in FIG. 21, the left-hand inclined edge 21b of the changeover bar 17 releases the bracket 15b while the right-hand inclined edge 21a causes the bracket 15a to turn in the direction opposite to its urged direction. As a result, the left-hand pinch roller 4b is pressed against the capstan 3b while the right-and pinch roller 4a is separated form the capstan 3a.

In addition, the left-hand turnable lever 7b is caused to turn clockwise under the pulling force of the spring 27b, thereby bringing the small diameter gear 9b in the rotation transmitting unit into meshing engagement with the large diameter gear 26b in the same rotation transmitting unit.

As shown in FIG. 21, the automatic reverse mechanism is hence brought into a state opposite to that depicted in FIG. 18 and the left-hand reel shaft 1b is driven in the winding direction. A playback or recording operation is hence performed while the tape is being taken up on the left-hand reel.

When the tape has been fully wound up on the left-hand reel in the above-described manner, slipping takes place in the friction mechanism interposed between the large diameter gear 26b and reel shaft 1b, resulting in stoppage of the reel shaft 1b. Accordingly, the contact portion 333 which has been maintained in sliding contact with the cam surface 11 is caused to come closest to the shaft 10a and is then separated from the cam surface 11. Similar to the state shown in FIG. 19, the cam 12 is brought into contact with the contact portion 333. As a result, the turnable lever 7a is turned against the force of the spring 27a as stated above and the changeover bar 17 is pushed again in the leftward direction by the bent end portion 13a. As a consequence, the engagement pin 322 is allowed to advance in the locking recess 334 to a position in the release recess 337, said position being located in front of the inclined portion 336. Upon elimination of the pressing force from the bent end portion 13a, the engagement pin 322 enters underneath the lower surface of the inclined portion 336 so that the changeover bar 17 is allowed to return simply in the rightward direction owing to the pulling force of the tension spring 23. Here, as shown in FIG. 18, the right-hand inclined edge 21a of the changeover bar 17 releases the bracket 15a while the left-hand inclined edge 21b causes the bracket 15b to turn in the direction opposite to its urged direction. As a result, the right-hand pinch roller 4a is pressed against the capstan 3a while the left-hand pinch roller 4b is separated from the capstan 3b.

Furthermore, the right-hand turnable lever 7a is caused to turn counterclockwise under spring force of the spring 27a whereby the small diameter gear 9a in the rotation transmitting unit is brought into meshing engagement with the large diameter gear 26a in the same rotation transmitting unit. As a result, the tap is caused to run rightwards again.

When it is desired to stop the playback operation, it is only necessary to push the stop lever 338. By this operation, the magnetic head 2 is caused to return from the play position to the stop position, i.e., eject position and the tape driving motor (not shown) is turned off, so that the tape recorder is stopped. This mechanism is omitted herein because it is commonly known.

When the stop lever 338 is operated on the other hand, the bulge 339 provided on the stop lever 338 slides on the lower surface of the end portion of the hook member 324 so that the hook member 324 is lifted. If the engagement pin 322 is in engagement with the hook member 324 and the changeover bar 17 is in the state moved leftwards as shown in FIG. 21 at this time, the engagement pin 322 is released from the locking recess 334 when the hook member 324 is lifted upwardly owing to the sliding contact of the bulge 339. As a consequence, the changeover bar 17 is allowed to return in the rightward direction. The tape always begins to run in the leftward direction when the next playback or recording operation is started. It is hence possible to omit the cumbersome operation to return to the side A even when the contents of information on the sides A and B of a tape is continuous.

Figure 22:
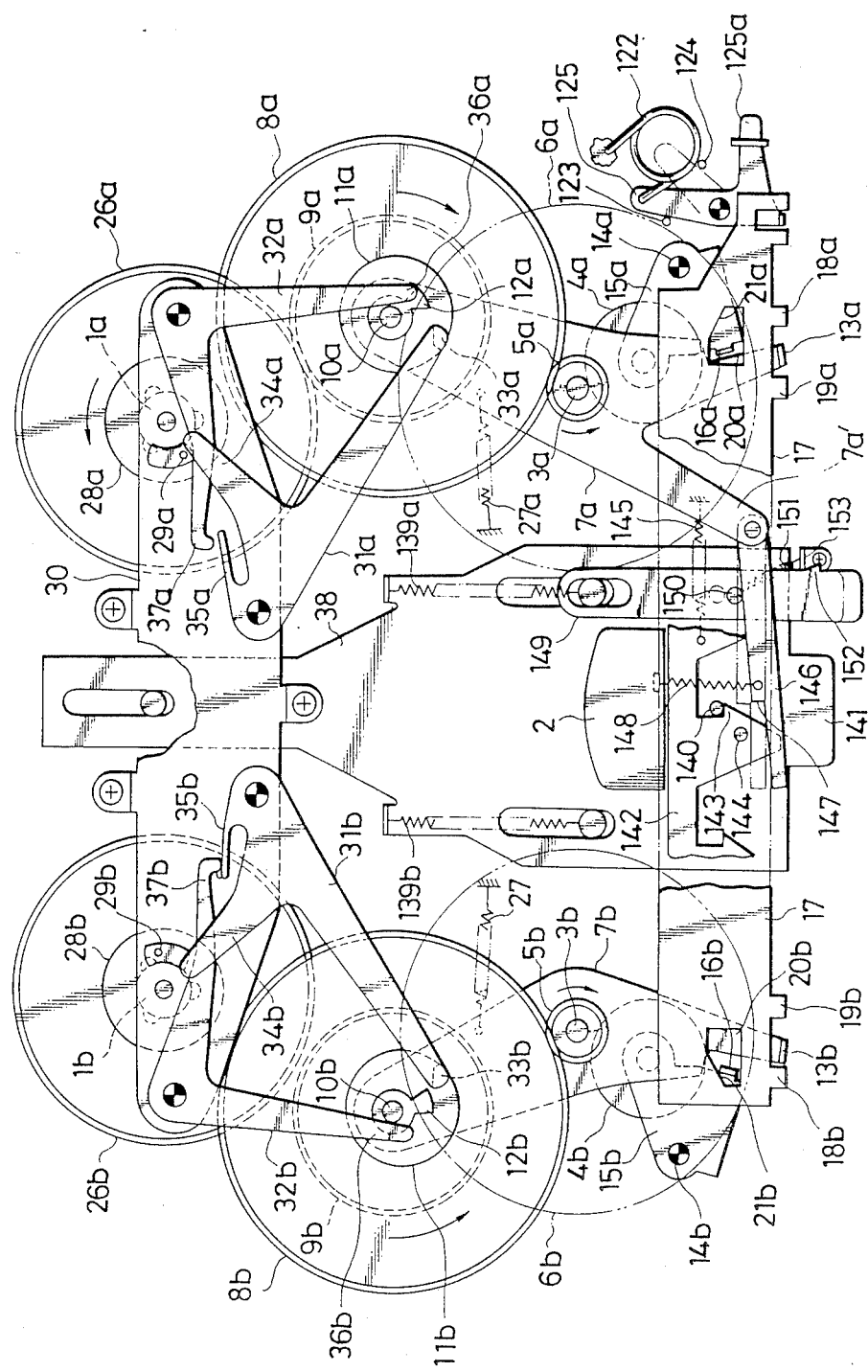
FIG. 22 to FIG. 24 schematically show the structure of an automatic reverse mechanism according to a sixth embodiment of this invention.
Figure 23:
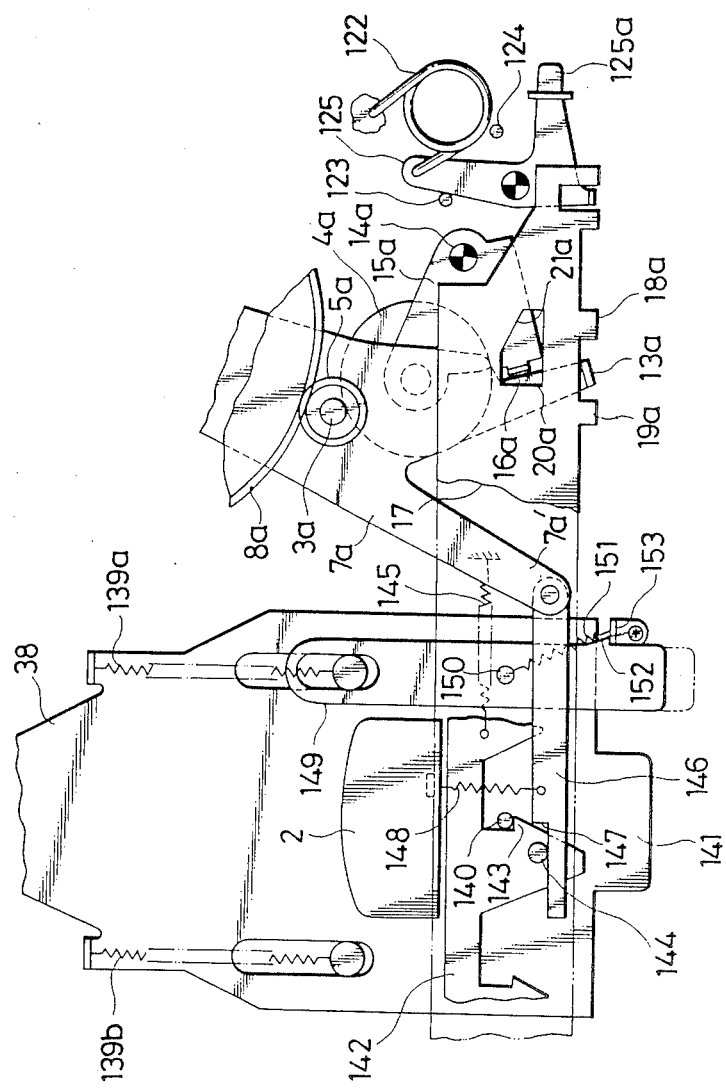
Figure 24:
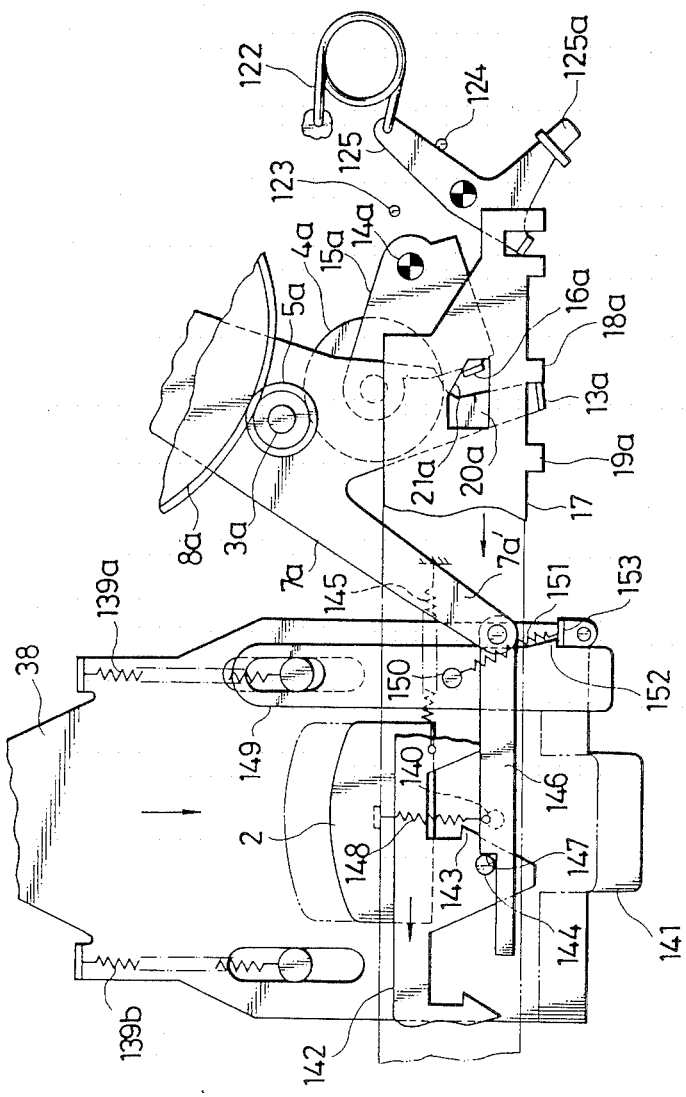

FIG. 22 to FIG. 24 illustrate the sixth embodiment of this invention. In these figures, the same elements of structure as those in FIG. 1 to FIG. 21 are identified by the same reference numerals. Description of the same elements of structure is therefore omitted herefrom.

The tape recorder according to the sixth embodiment has an automatic stop mechanism and a means for determining the starting side of a tape cassette, similar to the second embodiment mentioned above. The sixth embodiment is however different from the second embodiment in that the selector member 146 is pivotally supported on the turnable lever 7a.

Namely, the turnable lever 7a extends downwardly to form an extension 7a'. The selector member 146 is pivotally supported at one end thereof on the extension 7a' so that the selector member 146 is turnable.

Incidentally, a control lever 125a is provided as an integral member with the two-state plate 125 in order to permit manual operation.

When it is desired to automatically stop the tape recorder upon full take-up of the magnetic tape on the right hand reel in the playback or recording mode, it is necessary to push the selector lever 149 to position the selector member 146 at the single reverse mode position.

Namely, when the selector lever 149 is pushed to bring the hook portion 152 into engagement with the spring stud 153 as depicted in FIG. 23, the selector member 146 is caused to turn by the spring 148 following the lock pin 150 so that the stepped pressing portion 147 assumes a position on a side of the pressure-receiving pin 144 provided on the lock member 142.

The magnetic tape is wound fully on the right-hand reel in the above-described state. When the right-hand turnable lever 7a is caused to turn excessively clockwise beyond a predetermined rotation non-transmitting position, the selector member 146 is caused to move to a significant extent much that its stepped pressing portion 147 pushes the pressure-receiving pin 144 in the leftward direction. Accordingly, the lock member 142 is caused to move leftwards (releasing operation) to release the hook portion 143 from the engagement pin 140. As a result, the head mounting plate 38 is retreated by the springs 139a,139b so that the magnetic head 2 is caused to return to the stop position, i.e., the eject position.

Since the changeover bar 17 has moved to the left when the tape recorder was automatically stopped by the pushing operation of the selector lever 149, the left-hand reel always serves as a winding reel whenever the next playback or recording operation is started. Therefore, the magnetic tape runs in the leftward direction. Namely, if the next playback or recording operation is performed with the selector lever 149 still in its pushed state, the magnetic tape is first caused to run in the leftward direction. After the magnetic tape has been wound fully on the left-hand reel, the magnetic tape is caused to run in the opposite direction, i.e., in the rightward direction. The tape recorder is stopped automatically when the magnetic tape has been wound fully on the right-hand reel.

Let's assume that the control lever 125a of the tape running direction is caused to turn downwards so as to have the changeover bar 17 shifted in the leftward direction in a state that a playback or recording is being performed in the single reverse mode.

Since the selector member 146 was provided on the changeover bar 17 in the second embodiment described above, the second embodiment was accompanied by a drawback that the selector member 146 was caused to push the pressure-receiving pin 144 responsive to each leftward movement of the changeover bar 17 thereby to release the playback or recording mode.

When the selector member 146 is provided on the extending portion 7a' of the turnable lever 7a as described above, the turnable lever 7a does not turn beyond the predetermined rotation non-transmitting position even when the changeover bar 17 has been caused to move in the leftward direction by operating the control lever 125. The degree of movement of the selector member 146 responsive to the rotation of the turnable lever 7a is hence small so that the pressure-receiving pin 144 is not pushed. There is hence no danger that the playback or recording mode could be released accidentally upon a manual change-over of the running direction of the magnetic tape in the single reverse mode.

Figure 25:
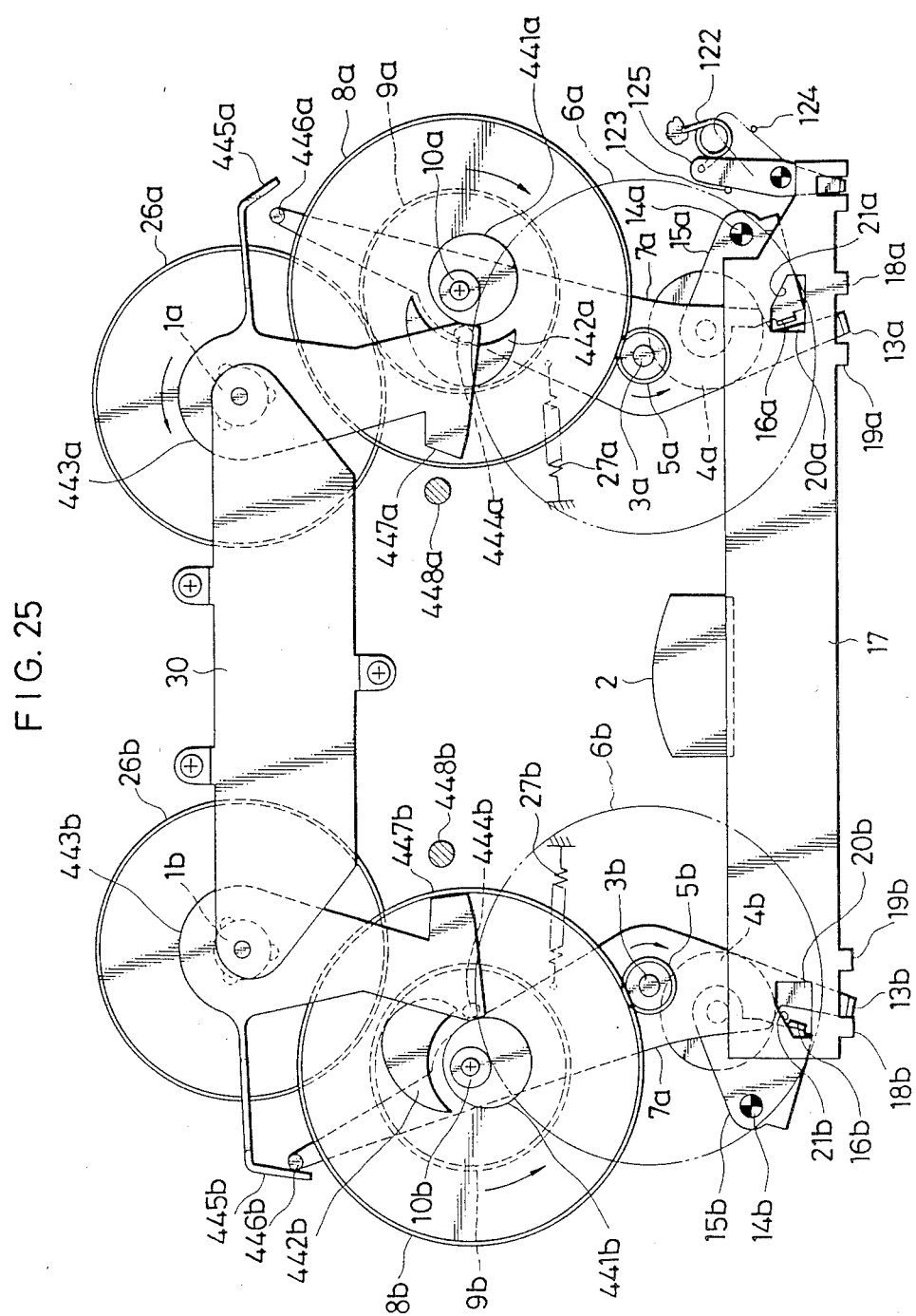
FIGS. 25 and 26 schematically depict the structure of an automatic reverse mechanism according to a seventh embodiment of this invention.
Figure 26:
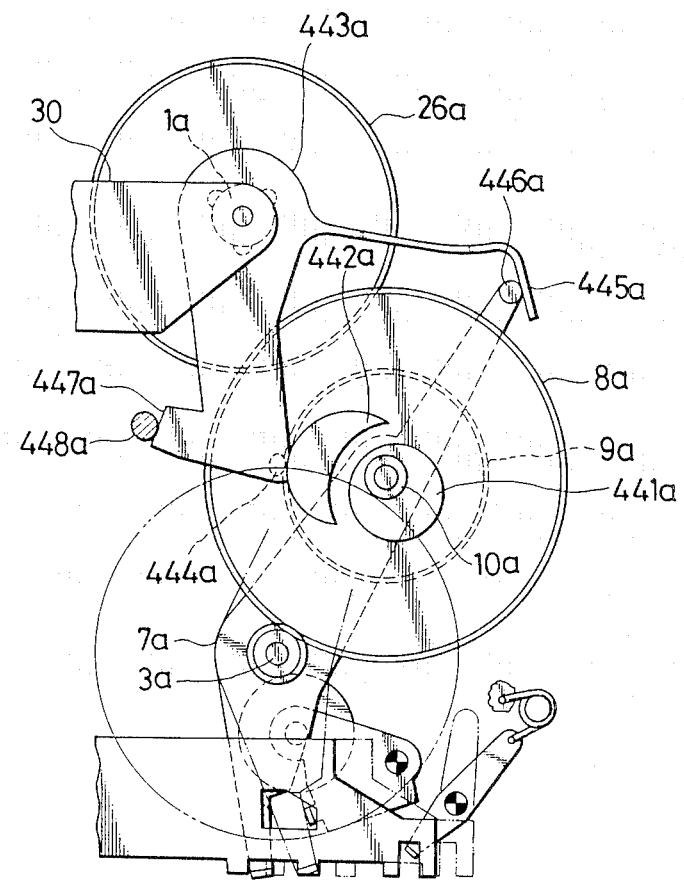
Figure 27:
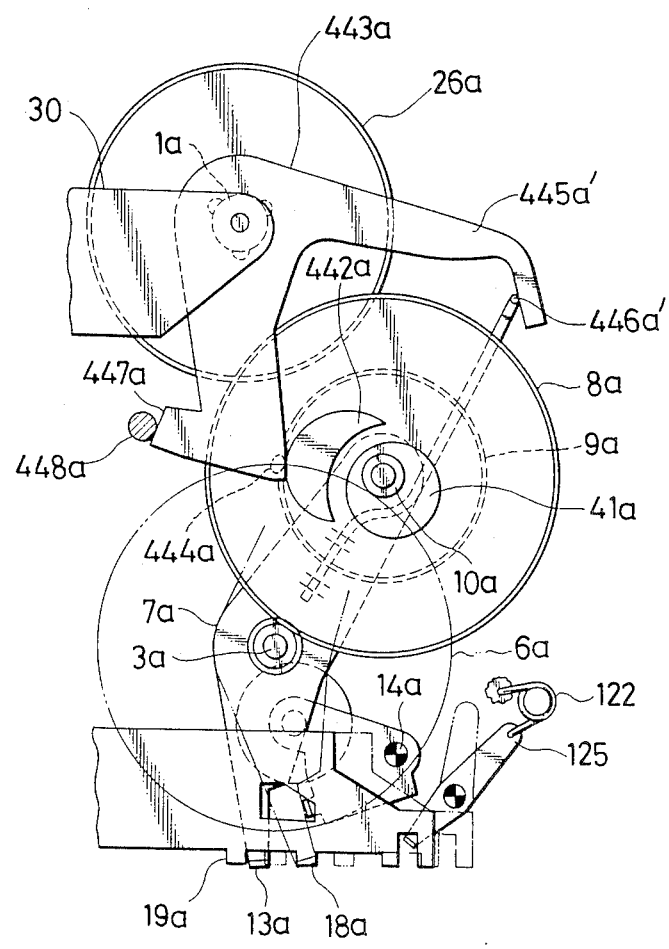
FIG. 27 schematically illustrates a modification of the seventh embodiment depicted in FIGS. 25 and 26.

A description will now be made of the seventh embodiment of this invention shown in FIG. 25 to FIG. 27. In these figures, the same elements of structure as those in FIGS. 1 to 24 are identified by the same reference numerals. Description of the same elements of structure is therefore omitted herefrom.

In the seventh embodiment, eccentric cams 441a,441b are provided respectively about the shafts 10a,10b of the gears 8a,9a; 8b,9b, which in combination constitute the rotation transmitting units, in lieu of the eccentric circular cam surfaces 11a,11b in each of the embodiments described above. Crescent-shaped cams 442a,442b are provided such that recessed peripheral surfaces thereof are facing the peripheral surfaces of the corresponding eccentric cams 441a,441b.

On the other hand, cam followers 443a,443b are provided respectively so that rotations of their corresponding reel shafts 1a,1b are transmitted via friction mechanisms of the same type as that shown in FIG. 28. The cam followers 443a,443b are equipped with sliding contact portions 444a,444b which are brought into sliding contact with the peripheral surfaces of the corresponding eccentric cams 441a,441b or the convexed peripheral surfaces of the corresponding crescent-shaped cams 442a,442b, engagement portions 447a,447b formed at positions opposite to the sliding contact portions 444a,444b respectively, and arm portions 445a,445b engageable with one ends 446a,446b of the corresponding rotary members 7a,7b. Here, the arm portions 445a,445b are provided in place of the auxiliary holding members 32a,32b in the first through fourth embodiments described above. They are formed in a thin shape as shown in the drawings and are equipped with characteristics of a spring. Stopper pins 448a,448b are also provided upright at fixed positions corresponding to the engagement portions 447a,447b respectively.

The operation of the automatic reverse mechanism according to the seventh embodiment will next be described. In FIG. 25, the right-hand pinch roller 4a is being pressed against capstan 3a. The rotation of the capstan 3a, the direction of which is indicated by an arrow, is being transmitted to the right-hand reel shaft 1a by way of the gears 5a,8a,9a,26a and a friction mechanism similar to that depicted in FIG. 28. In the above state, the rotary force of the reel shaft 1a is transmitted to the cam follower 443a via a friction mechanism which is also similar to that shown in FIG. 28. The sliding contact portion 444a of the cam follower 443a is hence maintained in sliding contact with the peripheral surface of the eccentric cam 441a. So long as the sliding contact portion 444a is maintained in sliding contact with the peripheral surface of the eccentric cam 441a in the above manner, the sliding contact portion 444a do not come contact with and the convexed peripheral surface of the crescent-shaped cam 442a. The rotation transmitting path extending from the capstan 3a to the reel shaft 1a by way of the gears 5a,8a,9a,26a and the friction mechanisms is therefore maintained.

Let's now assume that the playback or recording is performed while the tape is being wound up on the right-hand reel shaft 1a. At this time, since the changeover bar 17 is in a position moved in the right-hand direction at this time, the one end 446b of the rotary member 7b is pressing the arm 445b of the cam follower 443b so that the sliding contact portion 444b of the cam follower 443b is maintained in sliding contact with the peripheral surface of the eccentric cam 441b by virtue of the pressing force. The sliding contact portion 444b and the connexed peripheral surface of the crescent-shaped cam 442b are therefore maintained out of sliding contact. The left-hand rotation transmitting unit (gears 8b,9b) has been separated from the large diameter gear 26b to the non-engagement position relative to the reel shaft 1b.

When the magnetic tape has been wound up fully on the right-hand reel, slipping is developed in the friction mechanism interposed between the large diameter gear 26a and the reel shaft 1a so that the reel shaft 1a stops. The sliding contact portion 444a of the cam follower 443a, which has been kept in sliding contact with the peripheral surface of the eccentric cam 441a, is hence brought to the maximum eccentric position of the eccentric cam 441a, in other words, to a position most remote from the shaft 10a and stops there. When the gears 8,9a continue their rotations in this state, the sliding contact portion 444a is eventually brought into sliding contact with the convexed peripheral surface of the crescent-shaped cam 442a as illustrated in FIG. 26. The cam follower 443a is hence caused to turn clockwise. Upon subsequent engagement of the engagement portion 447a of the cam follower 443a with the stopper pin 448a, the turning movement of the cam follower 443a is stopped so that the turnable lever 7a is in turn caused to rotate clockwise against the force of the spring 27a to separate the gear 9a from the large diameter gear 26a. As a result, the transmission of the rotary force from the gear 9a to the large diameter gear 26a is stopped.

The reverse operation of the tape recorder is then performed in the same manner as in the embodiments described above.

Incidentally, the arms 445a,445b of the cam followers 443a,443b are equipped with characteristics of a spring in this embodiment. As an alternative, the one ends 446a',446b' (the arm 446b' is not shown) of the turnable levers 7a,7b (7b not shown) are formed in a thin shape to impart spring characteristics thereto. Instead, the arms 445a',445b' (the arm 445b' is not shown) of the cam followers 443a,443b are formed solid without imparting any spring characteristics thereto. The present invention can be practised by modifying it in various other ways within a scope not departing from the essential features of this invention.

We claim:

1. An automatic reverse mechanism for a tape recorder, in which capstans, pinch rollers and reel shafts are arranged symmetrically on both sides of an associated magnetic head, the capstans on both sides of the magnetic head and either one of said reel shafts are normally driven and rotated, the pinch roller on the same side as the rotating reel shaft is pressed against the corresponding capstan to cause the magnetic tape of a tape cassette inserted in the tape recorder to run in one direction, and when the magnetic tape has been fully wound up, the running direction of the magnetic tape is automatically changed over, comprising:
   a rotation transmitting means having a pair of rotation transmitting members arranged symmetrically relative to the magnetic head, said rotation transmitting members being rotated normally under rotary forces of the corresponding capstans so as to transmit the rotary forces to the corresponding reel shafts via friction mechanisms respectively;
   an eccentric circular cam surface provided eccentrically about a rotary shaft of at least one of the rotation transmitting members, and an engagement portion provided with said at least one rotation transmitting member;
   a reel-shaft stop detecting means for detecting each stop of at least one of the reel shafts, said means having a cam follower portion and a contact portion and adapted to receive a rotary force of said at least one reel shaft via a reel-stop detecting friction mechanism; said cam follower being maintained in sliding contact with the eccentric circular cam surface so as to avoid engagement between the contact portion and the engagement portion and when said at least one reel shaft stops, remaining at a position apart from the eccentric circular cam surface, whereby the contact portion is allowed to engage the engagement portion and at the same time said at least one rotation transmitting member is displaced from an engagement position to a non-engagement position relative to the corresponding reel shaft by a turning force developed in said at least one rotation transmitting member; and
   a reversing means operable responsive to each displacement of said at least one rotation transmitting member to the non-engagement position so that the pinch roller associated with said at least one rotation transmitting member is separated from its corresponding capstan, the other pinch roller is brought into contact with the other rotation transmitting member, and the other rotation transmitting member is displaced to an engagement position relative to its corresponding reel shaft.

2. The automatic reverse mechanism as claimed in claim 1, wherein the cam follower portion also serves as the contact portion.

3. The automatic reverse mechanism as claimed in claim 1, wherein the rotation transmitting means includes, in addition to said pair of rotation transmitting members, a pair of turnable members which are arranged symmetrically relative to the magnetic head, are turnable respectively about predetermined central axes, carry the corresponding rotation transmitting members rotatably thereon, and are connected at one ends thereof to the reversing means.

4. The automatic reverse mechanism as claimed in claim 3, wherein the reel-shaft stop detecting means comprises, with respect to each of the reel shafts, a pushing and urging member provided at a position other than the center of the corresponding reel shaft and adapted to receive a rotary force of the corresponding reel shaft via the associated reel-stop detecting friction mechanism, and a cam follower member and auxiliary holding member both supported pivotally; the cam follower member has the corresponding cam follower portion and contact portion, a pressure receiving portion positioned on the path of rotation of the pushing and urging member, and an elastic finger; and the auxiliary holding member has two arms, one located outside the rotary shaft of the corresponding rotation transmitting member and the other facing the elastic finger of the corresponding cam follower member.

5. The automatic reverse mechanism as claimed in claim 3, wherein the reel-shaft stop detecting means is equipped with pushing and urging members, which are provided at positions other than the centers of the respective reel shafts and are adapted to receive rotary forces of the respective reel shafts via the associated reel-stop detecting friction mechanisms, and a cam follower common to both reel shafts, said cam follower being supported pivotally; and the cam follower member has two pressure-receiving portions, which correspond to the pushing and biasing members respectively, the cam follower portion, and the contact portion.

6. The automatic reverse mechanism as claimed in claim 3, wherein the eccentric circular cam surface is an inner peripheral wall of a recess formed around the rotary shaft of the rotation transmitting member and the engagement portion is provided as an engaging projection in the recess.

7. The automatic reverse mechanism as claimed in claim 3, wherein the eccentric circular cam surface is an outer peripheral wall of a raised portion provided around the rotary shaft of the corresponding rotation transmitting member and the engagement portion is a crescent-shaped land provided on the rotation transmitting member with the concave peripheral wall thereof facing the raised portion.

8. The automatic reverse mechanism as claimed in claim 3, wherein the reversing means comprises a changeover bar, which is connected to both turnable members and displaceable reciprocally between a first position and second position, and a toggle spring for biasing the changeover bar selectively to either the first or the second position in cooperation with the turnable members.

9. The automatic reverse mechanism as claimed in claim 8, wherein a manually-operable member is interposed between the changeover bar and the toggle spring.

10. The automatic reverse mechanism as claimed in claim 9, wherein the manually-operable member also serves as a member for indicating the running direction of the magnetic tape.

11. An automatic reverse mechanism for a tape recorder, in which capstans, pinch rollers and reel shafts are arranged symmetrically on both sides of an associated magnetic head, the capstans on both sides of the magnetic head and either one of said reel shafts are normally driven and rotated, the pinch roller on the same side as the rotating reel shaft is pressed against the corresponding capstan to cause the magnetic tape of a tape cassette inserted in the tape recorder to run in one direction, and when the magnetic tape has been fully wound up, the running direction of the magnetic tape is automatically changed over, comprising:

- a rotation transmitting means having a pair of rotation transmitting members arranged symmetrically relative to the magnetic head, said rotation transmitting members being rotated normally under rotary forces of the corresponding capstans so as to transmit the rotary forces to the corresponding reel shafts via friction mechanisms respectively;
- an eccentric circular cam surface provided eccentrically about a rotary shaft of at least one of the rotation transmitting members, and an engagement portion provided with said at least one rotation transmitting member;
- a reel-shaft stop detecting means for detecting each stop of at least one of the reel shafts, said means having a cam follower portion and a contact portion and adapted to receive a rotary force of said at least one reel shaft via a reel-stop detecting friction mechanism; said cam follower being maintained in sliding contact with the eccentric circular cam surface so as to avoid engagement between the contact portion and the engagement portion and when said at least one reel shaft stops, remaining at a position apart from the eccentric circular cam surface, whereby the contact portion is allowed to engage the engagement portion and at the same time said at least one rotation transmitting member is displaced from an engagement position to a non-engagement position relative to the corresponding reel shaft by a turning force developed in said at least one rotation transmitting member;
- a reversing means operable responsive to each displacement of said at least one rotation transmitting member to the non-engagement position so that the pinch roller associated with said at least one rotation transmitting member is separated from its corresponding capstan, the other pinch roller is brought into contact with the other rotation transmitting member, and the other rotation transmitting member is displaced to an engagement position relative to its corresponding reel shaft; and
- a means for determining the starting side of the tape cassette by controlling the reversing means in such a way that an operating mode of the tape recorder is released to stop the tape recorder and responsive to the stop of the tape recorder one of the rotation transmitting members, said one rotation transmitting member being on a predetermined side, is displaced to the engagement position relative to the corresponding reel shaft.

12. The automatic reverse mechanism as claimed in claim 11, wherein the rotation transmitting means includes, in addition to said pair of rotation transmitting members, a pair of turnable members which are arranged symmetrically relative to the magnetic head, are turnable respectively about predetermined central axes, carry the corresponding rotation transmitting members rotatably thereon, and are connected at one ends thereof to the reversing means.

13. The automatic reverse mechanism as claimed in claim 12, wherein the reversing means comprises a changeover bar connected to both turnable members and displaceable reciprocally between a first position and second position, a spring for biasing the changeover bar toward the first position, and a hook for holding the changeover bar, which has been displaced by one of the rotation transmitting members toward the second position against the spring, so as to hold the changeover bar at the second position and for releasing its engagement with the changeover bar located at the second position by the other rotation transmitting member and the starting-side determining means.

14. The automatic reverse mechanism as claimed in claim 13, wherein the starting-side determining means comprises a means for stopping the operation of the tape recorder and a release means for releasing the changeover bar from the hook by an action of the stopping means.

15. The automatic reverse mechanism as claimed in claim 14, wherein the release means is a projection for lifting the hook, which has engaged a pin provided upright on the changeover bar and is holding the changeover bar at the second position, responsive to the stop means, whereby the engagement between the hook and pin is released.

16. An automatic reverse mechanism for a tape recorder, in which capstans, pinch rollers and reel shafts are arranged symmetrically on both sides of an associated magnetic head, the capstans on both sides of the magnetic head and either one of said reel shafts are normally driven and rotated, the pinch roller on the same side as the rotating reel shaft is pressed against the corresponding capstan to cause the magnetic tape of a tape cassette inserted in the tape recorder to run in one direction, and when the magnetic tape has been fully wound up, the running direction of the magnetic tape is automatically changed over, comprising:

a rotation transmitting means having a pair of rotation transmitting members arranged symmetrically relative to the magnetic head, said rotation transmitting members being rotated normally under rotary forces of the corresponding capstans so as to transmit the rotary forces to the corresponding reel shafts via friction mechanisms respectively;

an eccentric circular cam surface provided eccentrically about a rotary shaft of at least one of the rotation transmitting members, and an engagement portion provided with said at least one rotation transmitting member;

a reel-shaft stop detecting means for detecting each stop of at least one of the reel shafts, said means having a cam follower portion and a contact portion and adapted to receive a rotary force of said at least one reel shaft via a reel-stop detecting friction mechanism; said cam follower being maintained in sliding contact with the eccentric circular cam surface so as to avoid engagement between the contact portion and the engagement portion and when said at least one reel shaft stops, remaining at a position apart from the eccentric circular cam, whereby the contact portion is allowed to engage the engagement portion and at the same time said at least one rotation transmitting member is displaced from an engagement position to a non-engagement relative to the corresponding reel shaft by a turning force developed in said at least one rotation transmitting member;

a reversing means operable responsive to each displacement of said at least one rotation transmitting member to the non-engagement position so that the pinch roller associated with said at least one rotation transmitting member is separated from its corresponding capstan, the other pinch roller is brought into contact with the other rotation transmitting member, and the other rotation transmitting member is displaced to an engagement position relative to its corresponding reel shaft; and a means for determining the starting side of the tape cassette by controlling the reversing means in such a way that an operating mode of the tape recorder is released to stop the tape recorder and responsive to the stop of the tape recorder one of the rotation transmitting members, said one rotation transmitting member being on a predetermined side, is displaced to the engagement position relative to the corresponding reel shaft;

wherein the rotation transmitting means includes, in addition to said pair of rotation transmitting members, a pair of turnable members which are arranged symmetrically relative to the magnetic head, are turnable respectively about predetermined central axes, carry the corresponding rotation transmitting members rotatably thereon, and are connected at one ends thereof to the reversing means, and the starting-side determining means is equipped with a reverse mode selector means which permits manual selection of either one of two positions and stops an operation of the tape recorder responsive to a displacement of one of the turnable members only at one of the two positions.

17. The automatic reverse mechanism as claimed in claim 16, wherein the reversing means comprises a changeover bar connected to both turnable members and displaceable reciprocally between a first position and second position, a spring for biasing the changeover bar toward the first position, and a hook for holding the changeover bar, which has been displaced by one of the rotation transmitting members toward the second position against the spring, so as to hold the changeover bar at the second position and for releasing its engagement with the changeover bar located at the second position by the other rotation transmitting member and the starting-side determining means; and the reverse mode selector means is equipped with a selector member mounted on the changeover bar in such a state that the selector member can select either one of two positions, and the selector member causes the magnetic head to return to a stop position only when the changeover bar moves in one direction in a state that one of the positions has been selected.

18. The automatic reverse mechanism as claimed in claim 16, wherein the reversing means comprises a changeover bar connected to both turnable members and displaceable reciprocally between a first position and second position, a spring for biasing the changeover bar toward the first position, and a hook for holding the changeover bar, which has been displaced by one of the rotation transmitting members toward the second position against the spring, so as to hold the changeover bar at the second position and for releasing its engagement with the changeover bar located at the second position by the other rotation transmitting member and the starting-side determining means; and the reverse mode selector means is equipped with a selector member mounted on the changeover bar in such a state that the selector member can select either one of two positions, and the selector member causes the magnetic head to return to a stop position only when said one of the turnable members turns in one direction in a state that one of the positions has been selected.

19. An automatic reverse mechanism for a tape recorder, in which capstans, pinch rollers and reel shafts are arranged symmetrically on both sides of an associated magnetic head, the capstans on both sides of the magnetic head and either one of said reel shafts are normally driven and rotated, the pinch roller on the same side as the rotating reel shaft is pressed against the corresponding capstan to cause the magnetic tape of a tape cassette inserted in the tape recorder to run in one direction, and when the magnetic tape has been fully wound up, the running direction of the magnetic tape is automatically changed over, comprising:

a rotation transmitting means having a pair of rotation transmitting members arranged symmetrically relative to the magnetic head, said rotation transmitting members being rotated normally under rotary forces of the corresponding capstans so as to transmit the rotary forces to the corresponding reel shafts via friction mechanisms respectively;

an eccentric circular cam surface provided eccentrically about a rotary shaft of at least one of the rotation transmitting members, and an engagement portion provided with said at least one rotation transmitting member;

a reel-shaft stop detecting means for detecting each stop of at least one of the reel shafts, said means having a cam follower portion and a contact portion and adapted to receive a rotary force of said at least one reel shaft via a reel-stop detecting friction mechanism; said cam follower being maintained in sliding contact with the eccentric circular cam surface so as to avoid engagement between the contact portion and the engagement position and when said at least one reel shaft stops, remaining at a position apart from the eccentric circular cam surface, whereby the contact portion is allowed to engage the engagement position and at the same time said at least one rotation transmitting member is displaced from an engagement position to a non-engagement position relative to the corresponding reel shaft by a turning force developed in said at least one rotation transmitting member;

a reversing means operable responsive to each displacement of said at least one rotation transmitting member to the non-engagement position so that the pinch roller associated with said at least one rotation transmitting member is separated from its corresponding capstan, the other pinch roller is brought into contact with the other rotation transmitting member, and the other rotation transmitting member is displaced to an engagement position relative to its corresponding reel shaft;

a fast forward feeding member for causing the magnetic head to retreat when the fast forward feeding member is manually pushed in a playback mode;

a lock means for holding the fast forward feeding member at a pushed position upon manual pushing of the fast forward feeding member, said lock means releasing the holding of the fast forward feeding member when the fast forward feeding member is pushed again; and a fast forward feeding release means for releasing the holding of the fast forward feeding member responsive to an operation of the reversing means when the fast forward feeding member is held at its pushed position by the lock means.

* * * * *